US008200745B2

(12) United States Patent
Doerksen et al.

(10) Patent No.: US 8,200,745 B2
(45) Date of Patent: Jun. 12, 2012

(54) HANDHELD CLIENT FRAMEWORK SYSTEM

(75) Inventors: Richard Doerksen, Irvine, CA (US); David Besbris, Foothill Ranch, CA (US)

(73) Assignee: AOL Inc., Dulles, VA (US)

( * ) Notice: Subject to any disclaimer, the term of this patent is extended or adjusted under 35 U.S.C. 154(b) by 396 days.

(21) Appl. No.: 12/251,275

(22) Filed: Oct. 14, 2008

(65) Prior Publication Data

US 2009/0259714 A1 Oct. 15, 2009

Related U.S. Application Data

(63) Continuation of application No. 10/195,903, filed on Jul. 15, 2002, now abandoned.

(51) Int. Cl.
G06F 15/16 (2006.01)
(52) U.S. Cl. ...................................................... 709/202
(58) Field of Classification Search .......... 709/202–203; 345/700, 854
See application file for complete search history.

(56) References Cited

U.S. PATENT DOCUMENTS

| | | | |
|---|---|---|---|
| 5,574,979 A | 11/1996 | West | |
| 5,706,431 A * | 1/1998 | Otto | 709/221 |
| 5,721,827 A | 2/1998 | Logan et al. | |
| 5,726,984 A | 3/1998 | Kubler et al. | |
| 5,748,896 A | 5/1998 | Daly et al. | |
| 5,754,173 A * | 5/1998 | Hiura et al. | 715/744 |
| 5,812,865 A | 9/1998 | Theimer et al. | |
| 5,822,521 A * | 10/1998 | Gartner et al. | 709/230 |
| 5,857,201 A | 1/1999 | Wright, Jr. et al. | |
| 5,907,678 A | 5/1999 | Housel, III et al. | |

(Continued)

FOREIGN PATENT DOCUMENTS
EP 827098 A2 3/1998
(Continued)

OTHER PUBLICATIONS

Christopher, W.A., et al. The Nachos Instructional Operating System, 1993, USENIX Association, Proceedings of the USENIX Winter 1993 Conference, pp. 1-11.*

(Continued)

*Primary Examiner* — Wing Chan
*Assistant Examiner* — Alicia Baturay
(74) *Attorney, Agent, or Firm* — Michael A. Glenn; Glenn Patent Group

(57) ABSTRACT

A handheld client framework system provides a server proxy client that services client requests for network accessible information and determines the server that is most appropriate to supply the requested information and sends information request packets to that server across the Internet and/or intranet. Server responses to information requests are received by the server proxy client. The server proxy client separates the response information into the appropriate data components. Data components are sent to the appropriate client. Presentation and logic components are temporarily stored in a one-behind cache on the client. A client will continue to use the presentation and logic components already installed or in the one-behind cache to service the current user request. Any updates sent by the server proxy client and stored in the one-behind cache are retrieved by the client upon subsequent use by the user. The state of the client is saved by the server proxy client so that the client is not dropped when a user, for example, changes from a wired connection to a wireless connection. The invention includes a scripting language that supplies the logic component of the client and gives the client unlimited flexibility by allowing the host to modify the client's behavior or add new features at any time.

45 Claims, 12 Drawing Sheets

U.S. PATENT DOCUMENTS

| | | | |
|---|---|---|---|
| 5,940,771 A | 8/1999 | Gollnick et al. | |
| 5,948,066 A * | 9/1999 | Whalen et al. | 709/229 |
| 5,950,010 A * | 9/1999 | Hesse et al. | 717/178 |
| 5,999,179 A * | 12/1999 | Kekic et al. | 715/734 |
| 5,999,965 A | 12/1999 | Kelly | |
| 6,009,458 A | 12/1999 | Hawkins et al. | |
| 6,012,083 A | 1/2000 | Savitzky et al. | |
| 6,012,098 A * | 1/2000 | Bayeh et al. | 709/246 |
| 6,023,714 A * | 2/2000 | Hill et al. | 715/235 |
| 6,061,714 A | 5/2000 | Housel, III et al. | |
| 6,081,262 A * | 6/2000 | Gill et al. | 715/202 |
| 6,119,147 A | 9/2000 | Toomey et al. | |
| 6,122,403 A | 9/2000 | Rhoads | |
| 6,125,388 A | 9/2000 | Reisman | |
| 6,128,621 A | 10/2000 | Weisz | |
| 6,128,624 A | 10/2000 | Papierniak et al. | |
| 6,134,432 A | 10/2000 | Holmes et al. | |
| 6,151,584 A | 11/2000 | Papierniak et al. | |
| 6,151,601 A | 11/2000 | Papierniak et al. | |
| 6,161,123 A | 12/2000 | Renouard et al. | |
| 6,161,128 A | 12/2000 | Smyk | |
| 6,167,441 A * | 12/2000 | Himmel | 709/217 |
| 6,176,311 B1 | 1/2001 | Ryan | |
| 6,178,331 B1 | 1/2001 | Holmes et al. | |
| 6,182,142 B1 | 1/2001 | Win et al. | |
| 6,185,685 B1 | 2/2001 | Morgan et al. | |
| 6,189,102 B1 | 2/2001 | Beser | |
| 6,192,365 B1 | 2/2001 | Draper et al. | |
| 6,195,680 B1 | 2/2001 | Goldszmidt et al. | |
| 6,199,068 B1 | 3/2001 | Carpenter | |
| 6,199,096 B1 | 3/2001 | Mirashrafi et al. | |
| 6,202,023 B1 | 3/2001 | Hancock et al. | |
| 6,230,160 B1 * | 5/2001 | Chan et al. | 1/1 |
| 6,247,048 B1 * | 6/2001 | Greer et al. | 709/219 |
| 6,253,326 B1 * | 6/2001 | Lincke et al. | 726/12 |
| 6,269,380 B1 | 7/2001 | Terry et al. | |
| 6,300,947 B1 * | 10/2001 | Kanevsky | 715/866 |
| 6,397,259 B1 * | 5/2002 | Lincke et al. | 709/236 |
| 6,430,624 B1 * | 8/2002 | Jamtgaard et al. | 709/246 |
| 6,477,543 B1 * | 11/2002 | Huang et al. | 1/1 |
| 6,535,913 B2 * | 3/2003 | Mittal et al. | 709/219 |
| 6,549,221 B1 * | 4/2003 | Brown et al. | 715/854 |
| 6,581,186 B1 * | 6/2003 | Frost et al. | 716/139 |
| 6,584,499 B1 * | 6/2003 | Jantz et al. | 709/220 |
| 6,717,593 B1 * | 4/2004 | Jennings | 715/760 |
| 6,718,535 B1 * | 4/2004 | Underwood | 717/101 |
| 6,728,750 B1 * | 4/2004 | Anderson et al. | 709/201 |
| 6,735,186 B1 * | 5/2004 | Leppinen | 370/338 |
| 6,741,853 B1 * | 5/2004 | Jiang et al. | 455/418 |
| 6,775,671 B1 * | 8/2004 | de Lara et al. | 1/1 |
| 6,788,315 B1 * | 9/2004 | Kekic et al. | 715/733 |
| 6,801,604 B2 * | 10/2004 | Maes et al. | 379/88.17 |
| 6,807,631 B2 * | 10/2004 | Fuller et al. | 713/100 |
| 6,812,941 B1 * | 11/2004 | Brown et al. | 715/854 |
| 6,829,746 B1 * | 12/2004 | Schwerdtfeger et al. | 715/239 |
| 6,836,796 B2 * | 12/2004 | Schwartz et al. | 709/223 |
| 6,871,236 B2 * | 3/2005 | Fishman et al. | 709/246 |
| 6,880,014 B2 * | 4/2005 | Brown et al. | 709/227 |
| 6,912,522 B2 * | 6/2005 | Edgar | 1/1 |
| 6,920,480 B2 * | 7/2005 | Mitchell et al. | 709/203 |
| 6,920,607 B1 * | 7/2005 | Ali et al. | 715/206 |
| 6,934,933 B2 * | 8/2005 | Wilkinson et al. | 717/121 |
| 6,950,881 B1 * | 9/2005 | Ndili | 709/246 |
| 6,957,390 B2 * | 10/2005 | Tamir et al. | 715/744 |
| 6,966,028 B1 * | 11/2005 | Beebe | 715/205 |
| 6,976,090 B2 * | 12/2005 | Ben-Shaul et al. | 709/246 |
| 7,012,622 B2 * | 3/2006 | Wilkinson et al. | 345/629 |
| 7,013,329 B1 * | 3/2006 | Paul et al. | 709/217 |
| 7,032,180 B2 * | 4/2006 | Wilkinson et al. | 715/762 |
| 7,032,227 B2 * | 4/2006 | Wilkinson et al. | 719/319 |
| 7,054,878 B2 * | 5/2006 | Gottsman et al. | 1/1 |
| 7,065,744 B2 * | 6/2006 | Barker et al. | 717/109 |
| 7,072,984 B1 * | 7/2006 | Polonsky et al. | 709/246 |
| 7,076,728 B2 * | 7/2006 | Davis et al. | 715/205 |
| 7,089,330 B1 * | 8/2006 | Mason | 709/246 |
| 7,103,906 B1 * | 9/2006 | Katz et al. | 725/87 |
| 7,155,681 B2 * | 12/2006 | Mansour et al. | 715/762 |
| 7,200,809 B1 * | 4/2007 | Paul et al. | 715/205 |
| 2002/0065939 A1 * | 5/2002 | Liu | 709/248 |
| 2002/0099829 A1 * | 7/2002 | Richards et al. | 709/227 |
| 2002/0128908 A1 * | 9/2002 | Levin et al. | 705/14 |
| 2002/0143892 A1 * | 10/2002 | Mogul | 709/217 |
| 2002/0147749 A1 * | 10/2002 | Ortiz et al. | 707/523 |
| 2002/0152244 A1 * | 10/2002 | Dean et al. | 707/530 |
| 2002/0184343 A1 * | 12/2002 | Ashcroft et al. | 709/219 |
| 2003/0189593 A1 * | 10/2003 | Yarvin | 345/762 |
| 2004/0015537 A1 * | 1/2004 | Doerksen et al. | 709/203 |
| 2004/0049574 A1 * | 3/2004 | Watson et al. | 709/224 |
| 2005/0073982 A1 * | 4/2005 | Corneille et al. | 370/338 |
| 2005/0075115 A1 * | 4/2005 | Corneille et al. | 455/456.3 |
| 2005/0080804 A1 | 4/2005 | Bradshaw, Jr. et al. | |
| 2005/0183061 A1 * | 8/2005 | Papanikolaou et al. | 717/103 |
| 2006/0168526 A1 * | 7/2006 | Stirbu | 715/740 |
| 2006/0265359 A1 * | 11/2006 | Burst et al. | 707/3 |

FOREIGN PATENT DOCUMENTS

| | | |
|---|---|---|
| EP | 877320 | 11/1998 |
| EP | 926608 A2 | 6/1999 |
| EP | 926608 A3 | 6/1999 |
| EP | 949571 A2 | 10/1999 |
| EP | 949571 A3 | 10/1999 |
| EP | 996058 | 4/2000 |
| EP | 1069500 | 1/2001 |
| EP | 1071256 | 1/2001 |
| EP | 1079315 A2 | 2/2001 |
| EP | 1160672 | 12/2001 |
| WO | WO 98/51053 | 11/1998 |
| WO | WO 02/13026 | 2/2002 |
| WO | WO 02/17093 | 2/2002 |

OTHER PUBLICATIONS

Thomas Powell and Joe Lim; *The Challenges of a Wireless Web*; Network World' Mar. 20, 2000.

J. Bacon, D. Halls; *Mobile Applications for Ubiquitous Environments*; ICL Systems Journal; Nov. 1997.

Oliver Rist; *Feeding the Streaming Media Frenzy—streaming Media is the Drug, CDN's the Transport mechanism. Satisfying and Addicted Society Requires State-of-the-Art Hardware and Some Old-Fashioned Business Alliances*; Network Computing; Dec. 4, 2000.

*Nomadic Computing & Communications Conference*; Computer Conference Analysis Newsletter; Mar. 22, 1996.

George Gilder; *Telecosm: Goliath at Bay: Microsoft Suddenly Sees Itself Beset by Broadband Rebels and Its Own Middle Age*; Forbes; Feb. 26, 1996.

Jean-Christophe Cimetiere; *Business Drives Web Scalability*; Information Week; Sep. 25, 2000.

William Jackson; *Wireless LAN Extension Keeps Connections Up—* Government Computer News; Jun. 19, 2000.

Alexander Wolfe, Junko Yoshida; *Handhelds, Downsized PC's Smart Phones Converge on Comdex—Info Appliances Go Prime Time*;Electronic Engineering Times; Nov. 15, 1999.

Alison Classe; *Moving Targets*; Computer Weekly; Oct. 21, 1999.

Lawrence Kingsley; *Network Update: Get Off Your Haunches*; Seybold Report on Internet Publishing; Nov. 1997.

Bruce Robertson; *Coming to the Rescue of Wireless Middleware*; Network Computing; 1996, n710.

Lewandowski, S.M.; "Frameworks for component-based client/server computing"; Mar. 1998; ACM Press, ACM Computing Surveys (CSUR) vol. 30, Issue 1, pp. 3-27.

Microsoft .net Framework Product Overview and Reviewers Guide, 2001, 58 pages.

* cited by examiner

Fig. 10

HANDHELD CLIENT FRAMEWORK SYSTEM

CROSS REFERENCE TO RELATED APPLICATIONS

This application is a Continuation Application of U.S. patent application Ser. No. 10/195,903, filed 15 Jul. 2002 now abandoned, which is incorporated herein in its entirety by this reference thereto.

BACKGROUND OF THE INVENTION

1. Technical Field

The invention relates to the data delivery and translation in personal electronic devices. More particularly, the invention relates to retrieving and transmitting data available across a network to personal devices using an adaptable protocol and server proxy client.

2. Description of the Prior Art

Personal data devices have become common accessories in today's technology driven society. When PDAs, text pagers, cell phones, and personal computers first came into the marketplace, each device had to have its own custom architecture. The initial systems paved the way for a multitude of communication and operating system standards.

However, the wide variety of devices have caused problems in the software industry. Application programmers must port their programs to each device's operating system and display capabilities. For example, one PDA may have a 160× 160 pixel black and white display using the Palm OS while another uses a 180×240 color display using WinCE.

An application programmer must take into account the limitations of each device when creating the user interface for his program. Differing graphics capabilities between devices make it very difficult to achieve the same look and feel of a GUI across the varied platforms, for example. The application programmer must take into account that something that is easily displayed on one device may not be displayed on another or may not look the same between two devices.

CPU speeds also affect application programs. The efficiency of an application program must be tweaked for each platform in order for the program to be viable. Users do not want to use slow programs on their personal data devices.

Additionally, personal devices vary greatly in the available memory and whether the client software is stored in ROM. Small amounts of RAM make it difficult to manage data. While having a client software stored in ROM makes it difficult, if not impossible for the normal consumer, to upgrade.

All of these limitations create problems for application programmers.

A consequence of creating many different versions of a program to support different personal data devices is that it causes huge headaches in terms of supporting different code bases. Each code version must be debugged, updated and supported. When a data packet protocol or operating system changes, then so must the code base for that system.

One example is Microsoft Corporation's .NET framework which attempts to link together XML Web services in servers and clients. The .NET framework requires that all servers and clients communicate using XML and transfer information in XML. The result is a tightly woven network of XML services. This approach, however, requires that client devices process all aspects of the data being requested by users and displayed. It also requires application programs to be provided and supported for each differing platform. Additionally, the processing demand on the client systems require more powerful processors as the complexity of application programs increases.

It would be advantageous to provide a handheld client framework system that provides a client framework that is easily updateable from a host system and reduces processing demands on client systems. It would further be advantageous to provide a handheld client framework system that provides a programming language that is easily supported across multiple client platforms.

SUMMARY OF THE INVENTION

The invention provides a handheld client framework system. The system provides a client framework that is easily updateable from a host system and reduces processing demands on client systems. In addition, the invention provides a programming language that is easily supported across multiple client platforms.

A preferred embodiment of the invention provides a server proxy client that services client requests for network accessible information. The server proxy client determines the server that is most appropriate to supply the requested information and sends information requests to that server across the Internet and/or intranet.

Server responses to information requests are received by the server proxy client. The server proxy client separates the response information into the appropriate data components. Data components are sent to the appropriate client. Presentation and logic components are temporarily stored in a one-behind cache on the client. Clients verify with the server proxy client that the client is using the latest version of presentation and logic components for the particular task at hand. If the client is not using the latest versions, then it requests an update from the server proxy client. A client will continue to use the presentation and logic components that currently exist in the one-behind cache to service the current user request. Any updates sent by the server proxy client and stored in the one-behind cache are retrieved by the client upon subsequent use by the user.

The state of the client is saved by the server proxy client so that the client is not dropped when a user, for example, changes from a wired connection to a wireless connection. The user will not have to reauthenticate the client with the server proxy client and the user's session will continue as if there were no interruption.

The invention includes a scripting language that gives the client unlimited flexibility by allowing the host to modify the client's behavior or add new features at any time. The feature set can be deployed in stages from the server proxy client after the client has shipped. Client script updates are sent by the server proxy client to a client.

Other aspects and advantages of the invention will become apparent from the following detailed description in combination with the accompanying drawings, illustrating, by way of example, the principles of the invention.

BRIEF DESCRIPTION OF THE DRAWINGS

FIG. 10 is a schematic diagram of a stream object containing a stock price response according to the invention;

DETAILED DESCRIPTION OF THE INVENTION

The invention is embodied in a handheld client framework system. A system according to the invention provides a client framework that is easily updateable from a host system and reduces processing demands on client systems. In addition, the invention provides a programming language that is easily supported across multiple client platforms.

The invention provides a scripting language and client engine that gives a host system the flexibility to dynamically change the behavior and appearance of a client system. The client engine is easily adaptable to different client architectures and user interfaces. The host system includes a proxy client that performs the bulk of the data processing of the data accessed by a client system.

Figure 1:
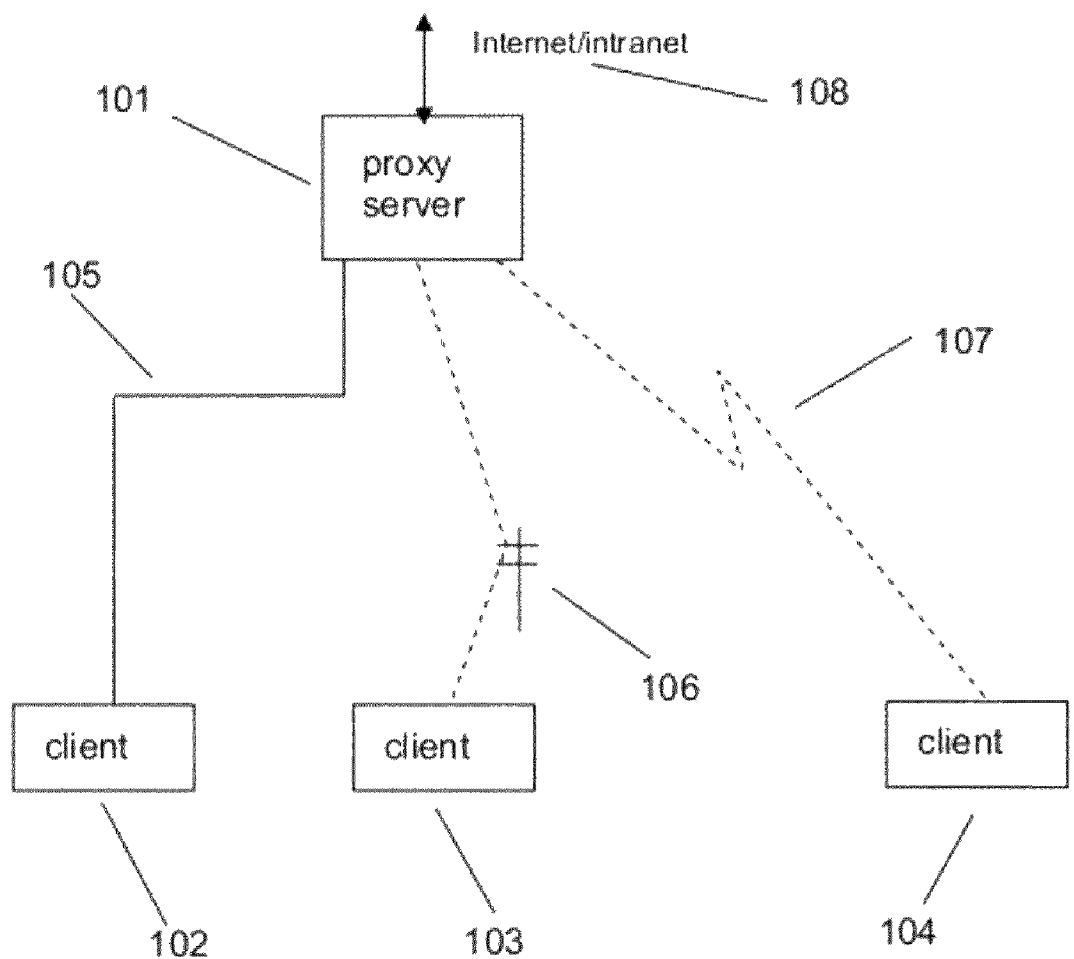
FIG. 1 is a block schematic diagram of the invention's server proxy client communicating with client devices across different communication media according to the invention.

Referring to FIG. 1, the invention provides a host-controllable architecture for applications to run on portable (and non-portable) devices such as PDAs, text pagers, cell phones, and personal computers 102, 103, 104. A server proxy client 101 is also provided that separates the data and presentation aspects of a session, each of which is sent independently to a client 102, 103, 104, such that the data are available without the presentation, e.g., for use independent of the presentation. The client devices 102, 103, 104, can be connected to the server proxy client 101 through a wired network 105, phone line 106, or satellite/wireless connection 107.

The server proxy client 101 obtains data for client requests through the Internet and/or intranet 108. Data are received by the server proxy client 101 and are processed into the basic data needed by the client before being sent to the client 102, 103, 104. The presentation aspects of displaying data are separately stored on the server proxy client and represent display properties that are specific to a particular client application. The separation of data and presentation components allows the client 102, 103, 104, to reuse the data for other display forms or to reinterpret the data for other applications.

The invention also provides a persistent proxy client (i.e., the proxy client component of the server proxy client) at the server proxy client 101 that maintains state for the client 102, 103, 104, which improves availability, for example, by allowing a user to switch from one transport, such as Ethernet, to another transport, such as Ricochet, without losing state or having to reauthenticate the user.

The invention consists of a client framework and a server proxy client 101 as noted above. The goal of the client framework is to provide maximum flexibility by having the client's behavior modifiable by the host. This allows rapid addition of new features to platforms that might not have a feasible means of updating the client code directly, such as a PDA with its client code burned in.

The invention accomplishes this flexibility by separating the presentation, logic, and the data components. This enables each component to be updated independently, thereby reducing network traffic and superfluous requests to the server. Additionally, this framework can be leveraged across several platforms reducing development time and bug counts for new clients by having a common, optimized, and tested code base.

The server proxy client 101 handles all requests from clients 102, 103, 104, and returns the responses in a uniform protocol. This greatly simplifies the responsibility of the client 102, 103, 104, which no longer has to understand multiple desktop-centric protocols such as HTTP, IMAP, and SMTP. Additional features are deployed from the server proxy client 101 as they are developed and received by the client 102, 103, 104, on demand.

The invention provides a common framework for building host controlled clients on various platforms such as the Palm OS, WinCE, Linux, Macintosh, and Windows. Once a device that has the client code burned into ROM has been released to customers, it is difficult, at best, to update the client. The invention's framework addresses this issue and several other difficulties involved with creating clients on portable devices.

The main goal of the framework is to allow the server proxy client to control and modify the behavior and feature set of the client without having to update the client code. Also, a common framework can be leveraged by client development to reduce bug counts and development time by sharing a common, optimized, and tested code path.

The invention's fundamental architecture separates client data, presentation, and logic into distinct components using an XML data model. When a client makes a request to the server proxy client, the response from the server proxy client comes down as a binary serialized XML data stream that preserves the semantic information of its contents. This allows the client logic, defined by scripts, to identify specific components of the response, make modifications, and utilize the data in any fashion. Additionally, the data sent to the client can be cached independent of the presentation, which means that it can be reused by other forms and displayed or reinterpreted in any fashion by the client logic at a later time.

Figure 2:
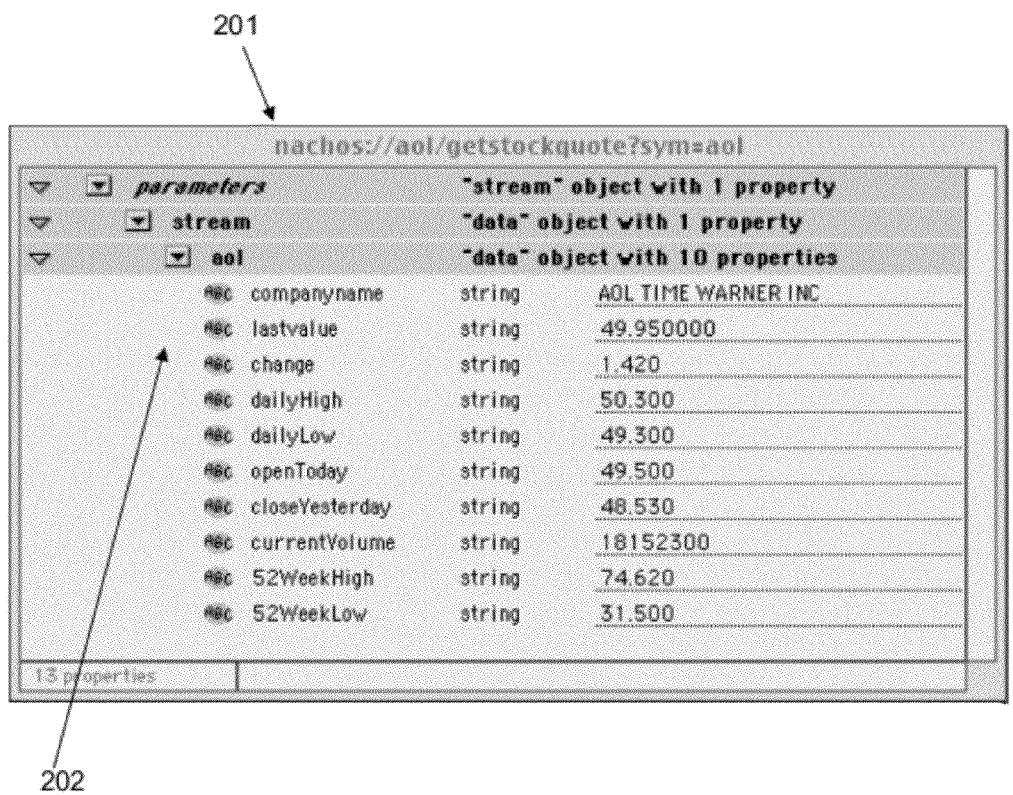
FIG. 2 is a schematic diagram of a stream object containing a stock price response according to the invention.

With respect to FIG. 2, the response to a stock quote request 201 comes back as a tree of values 202, each tagged with a name. This information 202 can be used by the logic on the clients to extract only the desired components of the request for display.

The presentation component of the client is also an XML data stream consisting of objects and properties. Properties can be simple, such as integers, strings, and Boolean values, or complex, such as scripts, or binaries that may contain the pixel data for an image, or rich text of a news story. Objects can be UI widgets such as a button, text field, or pop up menu, which have built in integer properties such as top, left, height and width. Additional built in properties might include a string for a caption or contents.

A native application can add built-in properties that make sense in view of the specific platform in order to better utilize native features such as font, size, color, and style. This flexibility is inherent in the invention's design in its uniform treatment of data streams.

Figure 3:
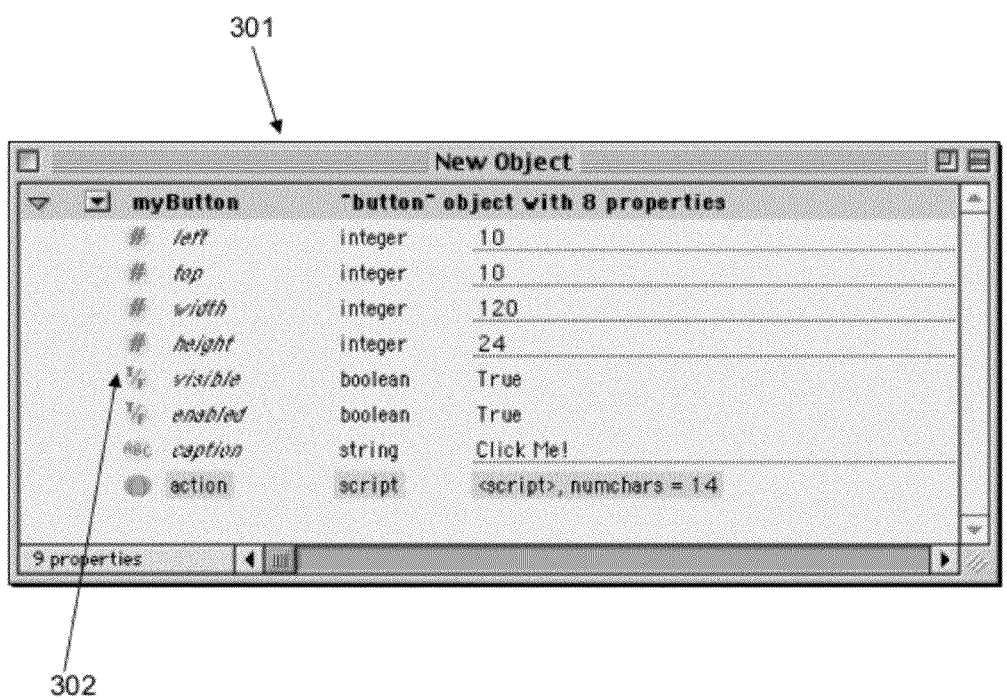
FIG. 3 is a schematic diagram of a button object according to the invention.

Referring to FIG. 3, the data model represents these objects and properties 301 as a simple tree 302 that expresses the layout of individual widgets contained in the current form.

When the user pushes a button on the form, it can activate a script that sends a request to the server proxy client, such as a stock quote, and has the logic to deal with the contents of the server proxy client's response to extract the company name and current price and use those values to populate the text field properties. However, the pristine form will be cached by the client so future requests for that service will display the form immediately, but still allow the user to make interactive requests such as specifying a different symbol for the stock quote or a different address to obtain a map. These forms or features are not burned into the client, rather, they are made available to the client by the server proxy client.

The invention's architecture includes a scripting language, described below, which supplies the logic component of the client. A script appears as just another property in the form, but it provides the client with intelligent action. When a user presses a button in a presentation, a script property associated with the button executes (as described below). A script can perform many tasks, from validating input on the form, to making a request to the server proxy client, to being invoked by an object to extract the desired pieces from a response and insert them into the appropriate places in the presentation. It might also modify locations of UI components to adjust for a specific response from the server proxy client, or it could modify the data in the response to meet the particular client's display limitations.

The scripting language gives the client unlimited flexibility by allowing the server proxy client to modify the client's behavior or add new features at any time. The feature set is no longer a development issue for the client but instead can be deployed in stages from the server proxy client after the client has shipped.

Another benefit of having active client-side logic manifests itself in the client's ability to provide much of its functionality without having a connection to the server proxy client. Hence, the client can still perform during intermittent or lost coverage and having a server proxy client connection further enriches the user experience by allowing the user to pick up where he left off during the intermittent or lost coverage. Lastly, the ability to update the client from the server proxy client enhances the client's durability and robustness by allowing certain bugs to be addressed by scripts when updating the client code directly would not be feasible.

The strength of the invention is that it offers a means of developing clients that can be modified and updated after their release. This point cannot be understated. It may appear as if the invention is a presentation package, but that results from the fact that the invention must compartmentalize the presentation, data, and logic. In doing so, the functions and features of the client are defined by the invention's forms made available to the client from the server proxy client. The active logic on the client allows that feature set to be much richer than simple HTML and yet tailored to that particular client. Additionally, the internal structure of the invention means that the developer instantiates only the portions needed and appropriate for the specific client, producing lightweight and robust clients quickly and efficiently.

Building a client that utilizes the invention's framework involves two major facets. First, the system's kernel must be given a means to access certain common features of the device, which must usually be routed through the operating system (OS). Secondly, the native implementation of the client must define the user interface widgets that are available on the device if support for the presentation layer is desired.

Figure 4:
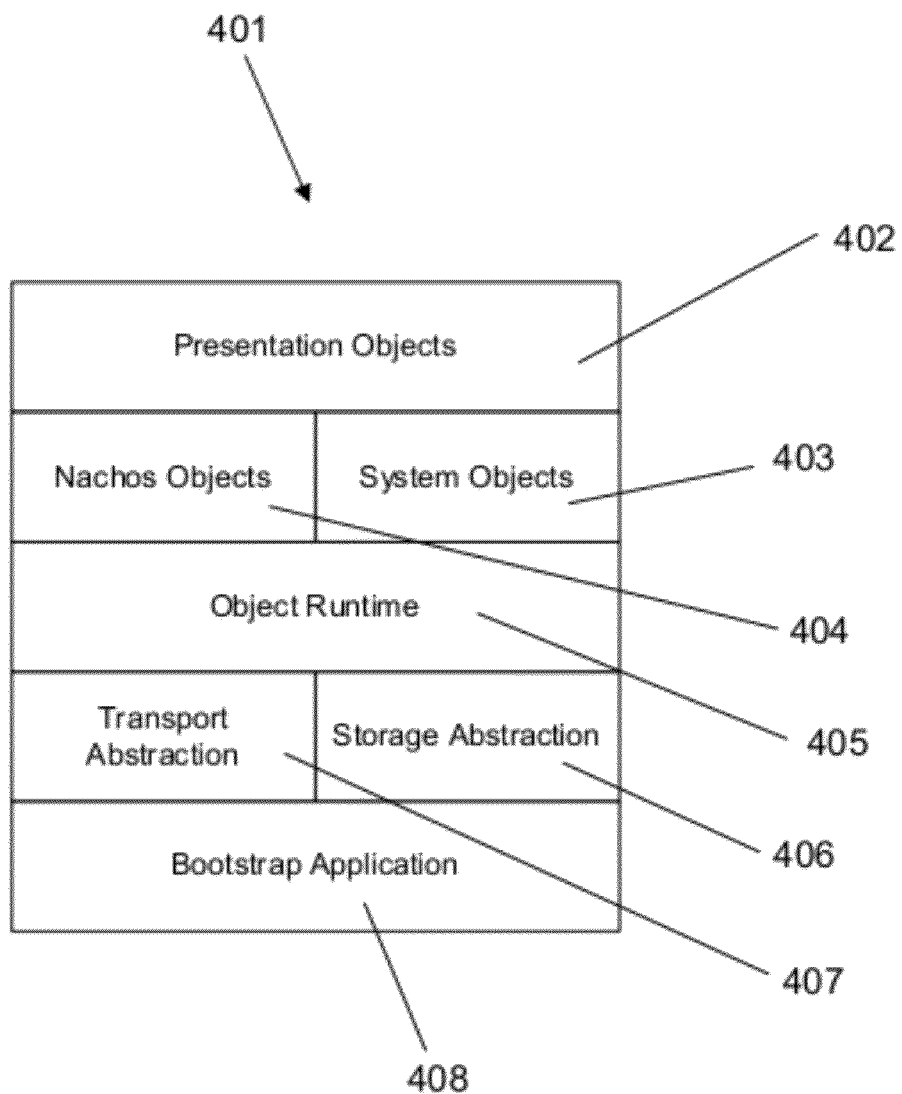
FIG. 4 is a block schematic diagram showing the five layers of a preferred embodiment of the invention according to the invention.

With respect to FIG. 4, the invention's framework is divided into five layers 401. The presentation layer 402, an object layer containing the invention's Nachos objects 404 and the system objects 403, an object runtime layer 405, an abstraction containing a transport abstraction 407 and a storage abstraction 406, and a bootstrap application layer 408.

The bootstrap application 408 contains a native implementation of the invention's kernel, and implements the hooks necessary for operation on the device such as transport and storage. The bootstrap application 408 can install objects into the runtime to expose services specific to the device. This' layer 408 can host additional functionality not related to the invention or incorporate other features not yet supported by the invention. Alternatively, it can act as a simple "glue" layer to handle device specific issues, such as communications, and implement the bulk of the user experience by deriving classes from the invention's presentation layer 402.

The invention defines an abstract base class called NachosSystemInterface. The client must derive a class from this base class and define all the virtual functions that provide the glue between the invention's framework and the native OS of the device. The virtual functions in this class include access to storage functions that define a rudimentary file system, a means of sending packets to AOL, image representation for that device, and the current time in UTC. Through these mechanisms, the invention provides essential functions such as caching and persistent storage in a database. This storage could be implemented in the form of RAM, flash memory, or even a hard drive on a desktop client. The invention makes no assumptions about the implementation that the native code supplies, only that it behaves in the fashion described in the NachosSytemInterface base class. Although the client can function without these, it would make the client much slower to respond to requests and preferences or other information could not be saved between sessions.

The second part of developing a native implementation of the invention requires integration of the user interface (UI) components. The invention defines a set of presentation objects 402 that are abstract representations of common UI widgets such as buttons, edit and static text fields, images, checkboxes, popup menus, etc. The native client is not required to implement all the widgets that the invention defines, but any widgets that are implemented must be registered with the runtime object 405 via the registerClass( ) method. This allows the client the flexibility to support only the widgets that make sense on that particular device without hard-coding any mandates into the invention's kernel.

The native code must derive a class from the invention's base class for each widget it implements and provide a means of displaying that widget. The invention does not perform any hit testing, drawing, or changes to the native widget on the screen. Instead, the derived class must handle events such as the creation and destruction of the system peer, notification that a property of the widget has changed due to user input, and the ability to notify the base class that the widget was clicked or selected. The notification of changes and actions that the invention receives from the derived classes in the native client code provides the means of receiving events and input on that particular device.

The invention's architecture also specifies a server proxy client to simplify the responsibilities of the client application by unifying all of the communications with the client to a single protocol. This reduces the size and complexity of the client by eliminating the need to parse multiple protocols. It also means that new protocols can be addressed by making changes to the server proxy client instead of having to update client code.

The invention has been designed to make it intrinsically robust. No native operation on the invention's hierarchy can corrupt the client. Similarly, the invention's virtual machine (VM) will simply abort the current script if it finds any unexpected data, byte codes, or illegal access. Still, it is difficult, if not impossible to test all conditions for such a complex environment. There are several compiler switches which log statistics and debugging information relevant to most aspects of the invention, including, but not limited to the script compiler, the script runtime VM, and the Message Center.

The client can optionally maintain a local database accessible through the invention. This database will act as persistent storage between sessions to maintain state information, user preferences, and a local cache.

The server proxy client will be the sole point of communication for all clients. Its architecture must be robust and scalable. The server proxy client will communicate with any number of other servers on the back end to create the data streams that it sends to the clients. However, many clients will not have a direct connection to the server, but instead will communicate over some wireless network. Both client and server account for such issues as significant latency and lack of or intermittent coverage.

The server proxy client becomes the central point of maintenance for the invention. Once the client has been deployed, it is dependent upon the server proxy client for much of its functionality. Development of content for clients requires the definition of request and response data stream formats, server components to handle the individual requests, and forms for device specific presentation.

The invention addresses many of the constraints that apply to micro clients by being a lightweight, cross-platform, client framework. The separation of data, presentation, and logic allow each component to be independently maintained and modified. The bulk of the client's features move from native client code to the VM. Because of this, the end user's experience on the client can be enhanced and modified without updating the client itself.

Figure 5:
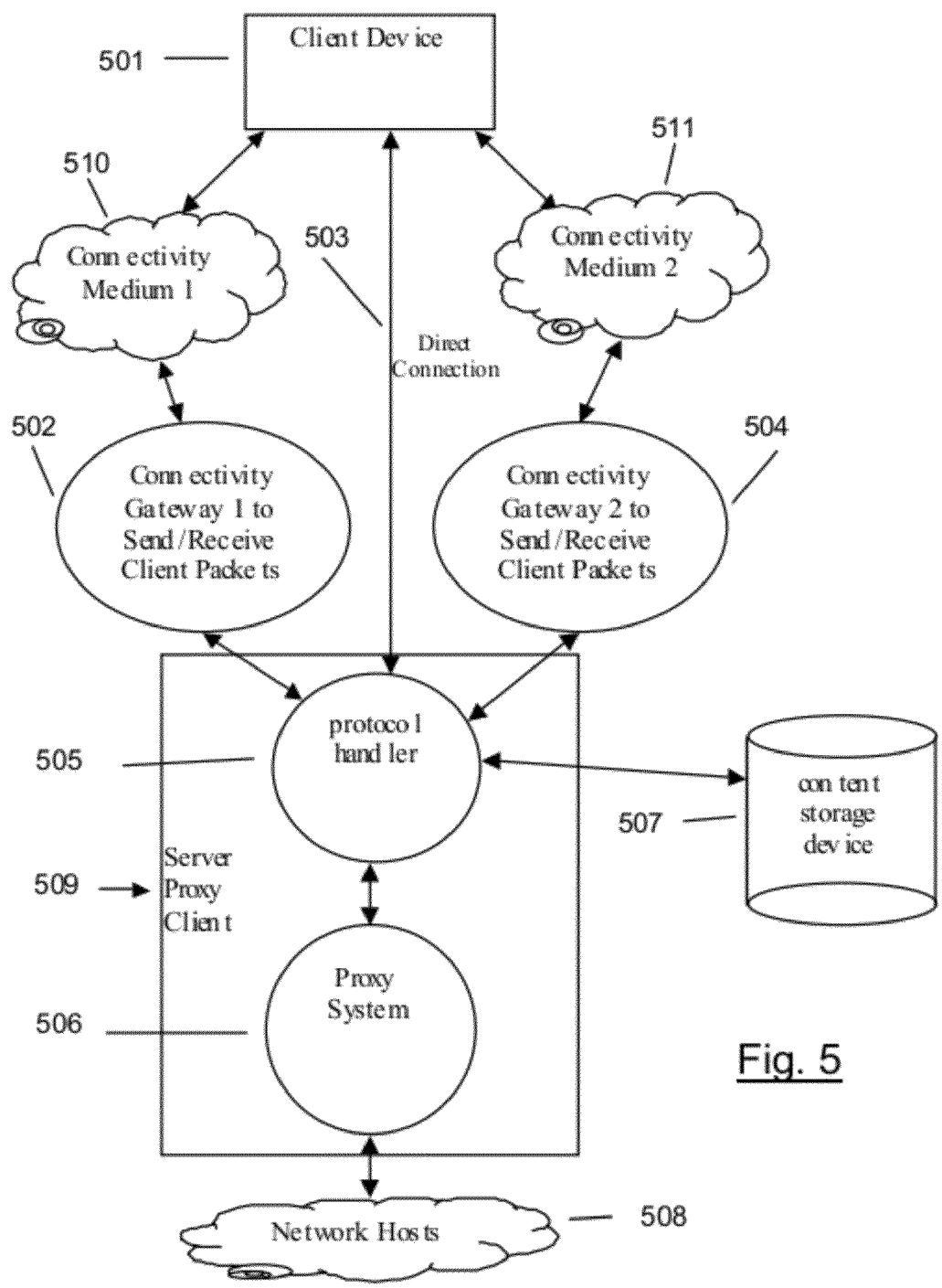
FIG. 5 is a block schematic diagram of an interface perspective of a preferred embodiment of the invention's client device and server proxy client according to the invention.

Referring to FIG. 5, an interface perspective of the invention's client device 501 and server proxy client 509 is shown. Data requests are sent from the client 501 either through connectivity medium 1 510 to the connectivity 1 gateway module 502, through direct connection 503, or through connectivity medium 2 511 to the connectivity 2 gateway module 504 to the protocol handler module 505. The connectivity gateway modules convert from whatever specific protocol is required for the connectivity medium to an Internet protocol and is then forwarded to the protocol handler module 505 in the server proxy client 509. The protocol handler module 505 interprets the request message and either makes requests of the Proxy System module 506 or if the request is for system content (such as presentation or logic components), retrieves system content from the content storage device 507.

The protocol handler module 505 and the Proxy System module 506 in the server proxy client 509, contain the current state of the client session between the network hosts module 508 and the client 501. This client session state is independent of the state of the connectivity between the client 501 and the protocol handler module 505. The client session state can freely transition between the connectivity medium 1 510, connectivity medium 2 511, or the direct connection 503 without requiring re-authentication, so to other users, the session is uninterrupted.

The Proxy System module 506 manages the multiple connections to the network hosts module 508. The Proxy System module 506 provides an application interface that the protocol handler module 505 uses and implements. The requests for data are correlated with the responses from the Proxy System module 506 by the protocol handler module 505 and the data is then formatted in accordance with the invention's protocol, and a response is sent either through connectivity gateway 1 module 502 through connectivity medium 1 510, through direct connection 503, or through connectivity gateway 2 module 504 through connectivity medium 2 511 to the client 501.

Requests for content to the protocol handler module 505 are handled by loading the content stream from the content storage device 507. The request contains information about the state of the content cached on the client device 501, if applicable. If the cached data is current, then a simple response is sent which causes the client to reset the expiration date of the cached data. If the cached data is not current, then this data is then formatted in accordance with the invention's protocol and a response is sent either through connectivity gateway 1 module 502 through connectivity medium 1 510, through direct connection 503, or through connectivity gateway 2 module 504 through connectivity medium 2 511 to the client 501. before the data is formatted, it is either compiled before the formatting (on demand) or precompiled and stored on the storage device 507, which option is chosen is dependent upon whether compiling on demand becomes a bottleneck in the Proxy System module 506.

Content can be updated on the client 501 by the cache spoiling mechanism described above. A new version of the content is published to the content storage device 507 and when requests for the content are made by the client 501, the new version is automatically retrieved from the content storage device 507 and sent to the client 501. Content can be a data, presentation, logic, or any combination of the three. Although the new version is sent to the client 501, the old version of the presentation and/or logic will be used by the client 501 to eliminate latency that might be experienced by the end user.

The new version of the presentation and/or logic are placed in a one-behind cache on the client 501. The next time the user requests the content, the client 501 will check the one-behind cache to see if a version exists for that particular content. When the client 501 retrieves content from the one-behind cache, it first checks whether the content has expired. The client 501 will always use the currently cached version of the presentation and/or logic from the cache. If the content has expired, the client 501 will check with the Proxy System module 506 to see if a new version is available. If the Proxy System module 506 determines that the client 501 has the newest version, an acknowledgement will be sent to the client 501 to reset the expiration date of the cached content. If the Proxy System module 506 determines that a newer version is available, the new version of the presentation and/or logic is sent to the client 501 and placed in a one-behind cache on the client 501. The version request process described above repeats if a new version is published to the content storage device 507.

The client architecture is designed to be efficient, portable and flexible. It is intended to allow for a common code base to leverage many different platforms.

Given the design of the invention's kernel, a developer starting on a new client has much less to do than on a usual client development. The invention's kernel itself will take care of most logic and functionality of the application. The developer will mainly just need to focus on two areas: UI integration and system "glue".

For the UI integration, the invention provides a set of presentation objects that are abstract representations of common UI widgets. These include such widgets as button, rectangle, image, checkbox, etc. However, these are logical entities only. It is up to the client developer to extend these with versions that will hook into the UI layer on the target platform.

The presentation objects are based on the concept of utilizing a native peer. That is, for each NachosButton, the kernel expects that the client developer provided the code to create a button in the target platform's desired UI toolkit. It is also required that the native button will both accept changes from the NachosButton to the peer and pass user interactions from the peer to the NachosButton.

A client developer is not required to implement classes for all presentation objects. Only those necessary to support desired applications on the target platform must be present. However, developers are encouraged to implement as many objects as reasonable. Any classes created by the client developer in the presentation objects should be registered with the runtime's registerClass( ) method. This is how the kernel knows to hook into the classes present for a given version of a client program, and will not try to utilize unsupported objects.

The main ancestor class is NachosUIObject. This provides support for gluing to a native peer. The two more important methods are _createSystemPeer( ) and _destroySystemPeer( ). These functions must handle a call properly at any time (including calls to _destroySystemPeer before _createSystemPeer). _createSystemPeer( ) must be sure to get its initial state from the properties of the object to which it is attached. The kernel will call these as needed in order to maintain a presence in the target platform's UI. In general, any data and state should be stored in the subclass of the object in order to free the kernel to destroy and recreate the native peer as needed.

Subclasses of NachosUIObject include NachosForm and NachosWidget. In Nachos a NachosForm is the main container in which a UI may be constructed. NachosWidget is the base class for all widgets such as buttons, images, rectangles, etc. Non-widget subclasses of NachosUIObject include NachosTimer and NachosItemsObject.

Each object may have both built-in and run-time properties. Built-in properties cannot be deleted nor renamed, and are guaranteed to be present in any instances. Any additional properties of an object will be its children. These could be UI objects, data objects or other properties such as scripts, binaries, integers, booleans, or strings.

Figure 6:
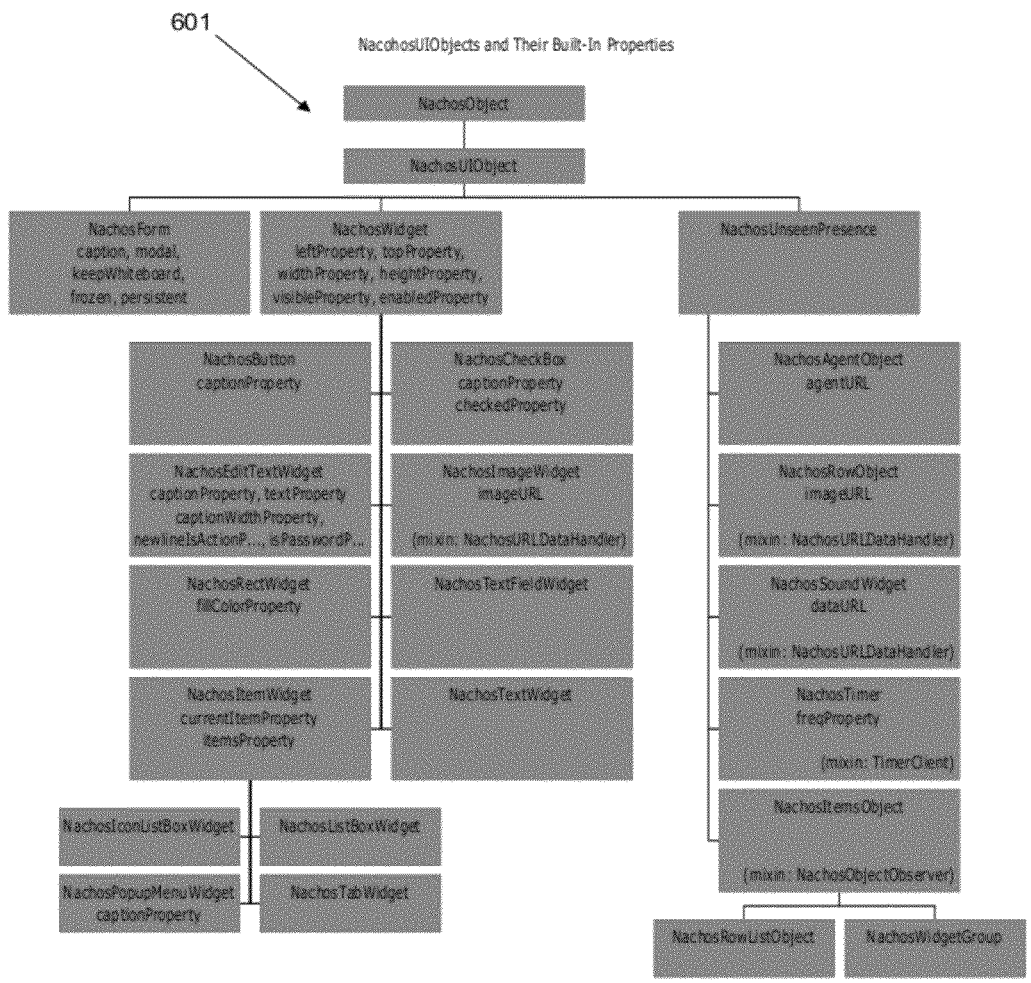
FIG. 6 is an exemplary hierarchical object tree representing the derivation of objects according to the invention.

With respect to FIG. 6, an exemplary hierarchical object tree 601 representing the derivation of objects in the invention is shown.

NachosForm has the following built-in properties:
caption—the string title of the form to display in the caption area
modal—a boolean to tag the form as modal or non-modal
keepWhiteboard—a flag for preserving data on the whiteboard when the form is loaded
frozen—the UI should not draw the form while this is true
persistent—this form and its data will be saved even after it is undisplayed NachosWidget has the following built-in properties:
left—the placement of the left edge of the widget in the UI
top—the placement of the top edge of the widget in the UI
width—the width of the widget
height—the height of the widget
visible—true if the widget is currently visible
enabled—true if the widget is 'active' and will respond to user input Other objects that derive from NachosWidget may have additional built-in properties. For instance, a button has a caption property that acts as a label the button, or a rect widget, which as an integer to denote the fill color of the rectangle.

The coordinates for left and top are absolute coordinates in the display area. Any part of the display that is reserved for the form's caption does not count for coordinates in the display area. For example, if the form caption area was at the top of the form, top=0 would place a widget at the first pixel below the form caption area.

Some UI toolkits place native widgets in absolute space and some place them relative to their parents. It is the job of the client developer to ensure that any needed transformations of coordinates are done between the NachosWidget and its native peer.

The other important part for a client developer to implement is the code to "glue" the invention to the target platform. An implementation of NachosSystemInterface needs to be provided to the NachosRuntime upon initialization. The kernel will then use this implementation to perform its interactions with the target platform. This includes local storage and network access.

If storage is supported on the target platform, an implementation of NachosDataStreamInterface should be supplied, plus the additional needed methods implemented from NachosSystemInterface.

An exemplary specification of the invention's scripting language is shown below.

Introduction

The invention's client framework provides a host-controlled, intelligent client. The concept of host controllability offers distinct advantages over a static client. It allows the rapid addition of new features to clients on platforms that might not have a feasible means of updating the client code directly, e.g., devices that have their client code burned in. Also, unexpected problems with the client can be circumvented or eliminated by modifying the client's behavior from the host. Additionally, since a client is more than a dumb terminal that simply displays information from the host, it maintains much of its functionality even when not connected to the host. This is particularly valuable on clients that have high latency connections or that need to function well offline.

The invention achieves this flexibility by separating the presentation, logic, and the data from each other using an XML data model, which enables each component to be modified or updated by the host independently of each other. This document will explain some of the fundamental principles of the invention while focusing on the invention's scripts. In order to use the scripting language effectively, the scriptwriter will need to understand the data model in terms of the invention's properties, the presentation component in terms of the invention's widgets, and lastly the capabilities of the scripting language itself.

Scripting Properties

The fundamental building block of the scripting language is a property. Every property has a name and a value. The name acts as a label that can be used when referring to the property. Names of properties can be of arbitrary length and consist of any printable character. However, names that start with a letter or underscore and are followed by any series of letters, numbers, or underscores are the most easily accessed name from the scripting language. The names of properties are not case sensitive. Examples of property names are:

```
Homer            // this is fine
homer            // this is good, but is the same name as Homer
_bart            // okay, this is good
_1abc            // starting with an underscore is acceptable
155 Springfield Lane    // this is a valid property name as well,
                        // but rather difficult to access from a script
```

The value of the property can be one of several types. Simple value types are integer, string, and Boolean. These are the most commonly used and properties that will be directly examined or modified from a script

```
HomersHometown   "Springfield"   // a string property
SimpsonCount     5               // an integer property
HomerHungery     True            // a Boolean property
```

There are more complex properties such as scripts and binaries. In general, the contents of complex properties cannot be modified from a script, but the complex property itself can be moved, copied, or deleted. Binary properties are used for images, large bodies of text, and anywhere you have large "blobs" of data.

The last kind of property deserves special consideration. It is the object property.

Objects

An object is unique because it acts as a container for other properties. Like all properties, an object has a property name, but is also has a "class". The class of the object designated by the class name defines certain attributes about the object such as what properties it contains by default and what types of additional properties that it can contain.

Figure 7:
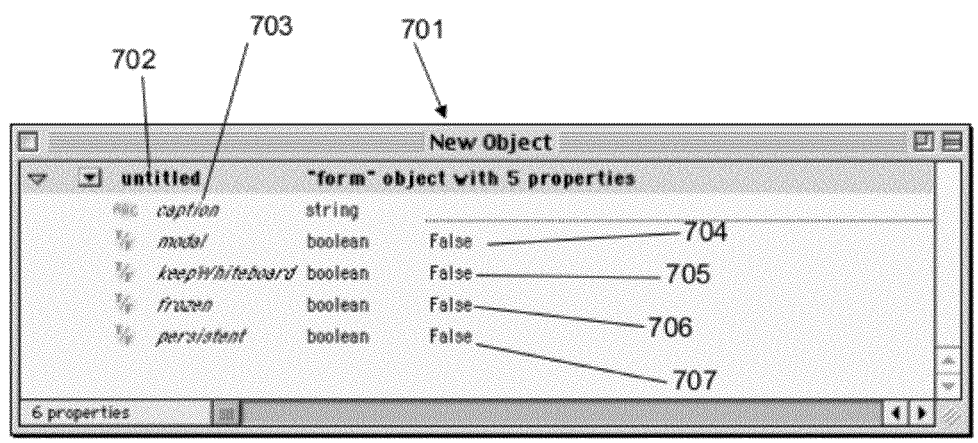
FIG. 7 is a schematic diagram of a form object according to the invention.

With respect to FIG. 7, an editor tool has been used to create a "form" object 701 named "untitled" 702. When the framework creates a form object 701, it appends certain built-in properties, which cannot be removed or reordered. A form will always have a string property named caption 703, and Boolean properties named modal 704, keepWhiteboard 705, frozen 706, and persistent 707. Each of these properties governs the characteristics and behavior of the form such as whether is should maintain its state once it has been displayed (if persistent 707 is true), or whether it should clear the global area for inter-form communication (if keepWhiteboard 705 is false). A "form" is one example of an object class, but many classes exist. Another common class is a "button"

Figure 8:
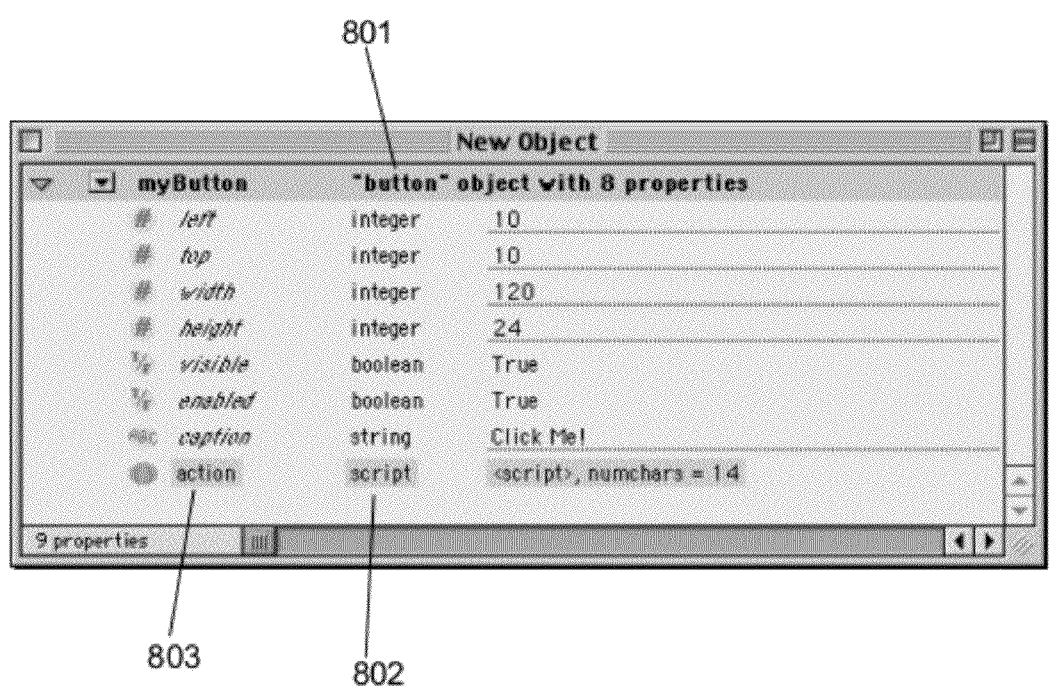
FIG. 8 is a schematic diagram of a button object according to the invention.

Referring to FIG. 8, all UI widgets in are actually just objects with certain built-in properties to control its appearance. The button 801 has a script 802 which will be called anytime the button object 801 receives an "action" message 803, described below.

Figure 9:
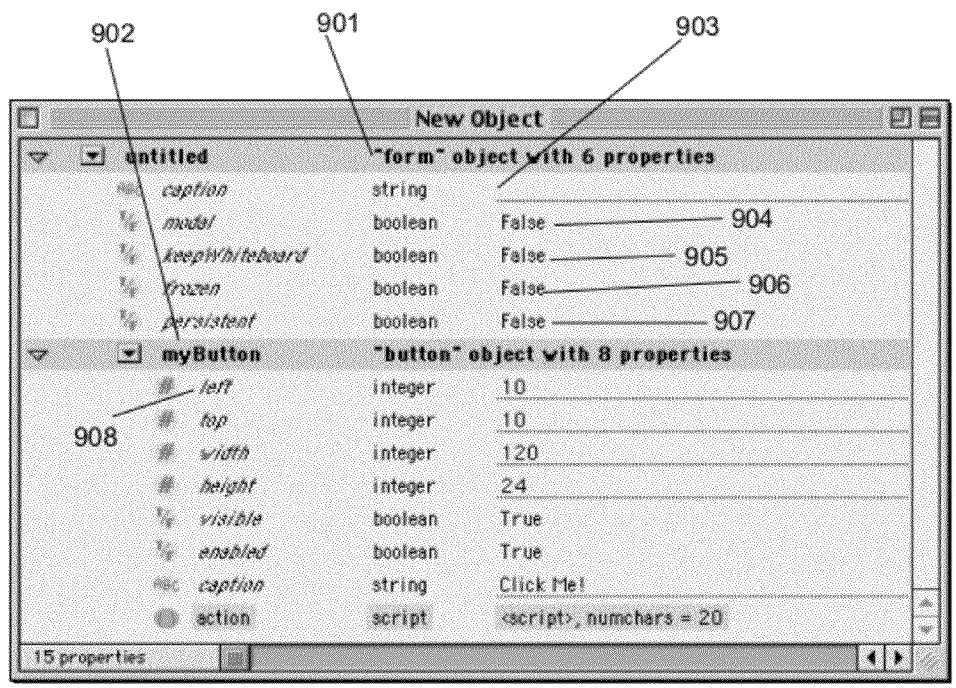
FIG. 9 is a schematic diagram of a form object containing a button object according to the invention.

With respect to FIG. 9, a button object 902 created in the form 901 is shown. By creating an object inside of another object, the properties can no longer be expressed as a simple list. Instead the form 901 now appears as a hierarchy where each property is owned by a parent object. The button, myButton 902, owns the integer property named left 908 and everything below it, while the form owns the properties named caption 903, modal 904, keepWhiteboard 905, frozen 906, persistent 907, and myButton 902.

The other responsibility of an object besides containment is message handling.

Messages

The unit of communication is a "message" class object. The message has a source object and a destination object to which it is sent and usually contains some additional information in an object of class "stream" called parameters. The parameters object acts as the container for information required for a request or response. For instance, if a script sends a message requesting a stock quote for "AOL" the parameters object of the message it sends would have a property called "sym" with a string value of "aol".

Figure 10:
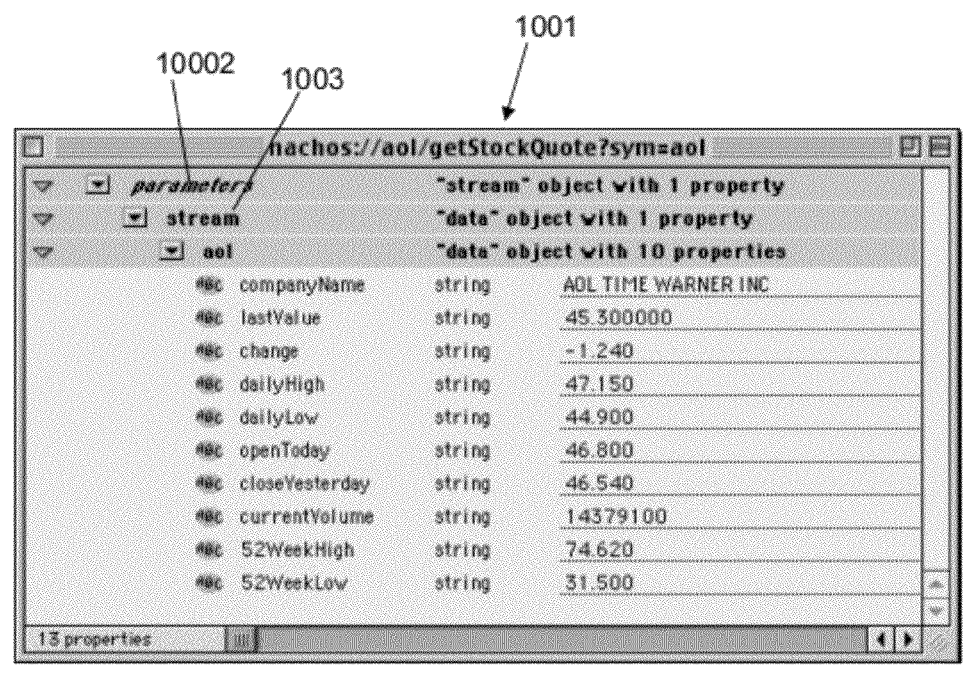

Referring to FIG. 10, an exemplary response from the server 1001 is shown. In this case parameters 1002 contains another "data" class object called stream 1003 that holds the stock quote. The script can access each of these properties individually by name or index.

A message also has an echo object of class "stream", which contains any properties that were specifically included in the original message that the sender wants to receive in the reply. This might be used to copy data that generated the request to the recipient of the reply. For example, in a mail application, a script might send a "fetchBody" message to the host carrying along the message ID as an echo, so that when the reply comes back it can associate the response with the mail without needing a map of ID's to transactions.

Many messages have a corresponding reply message. For instance, a load message request will return the results in a reply message. Similarly, a save message sends a notification of completion with a reply message. Most scripts use blocking calls to wait for the response so the name of the reply isn't generally needed. However, there are times when the sender might wish to override the default reply name for asynchronous requests which might require specific reply names so the appropriate script can process the response. This can be accomplished by setting the replyName property to the desired message name. This is used to demultiplex responses coming back to an object much like the echo parameters are, but in a way that is less general, and often easier to use.

The Runtime Root

Figure 11:
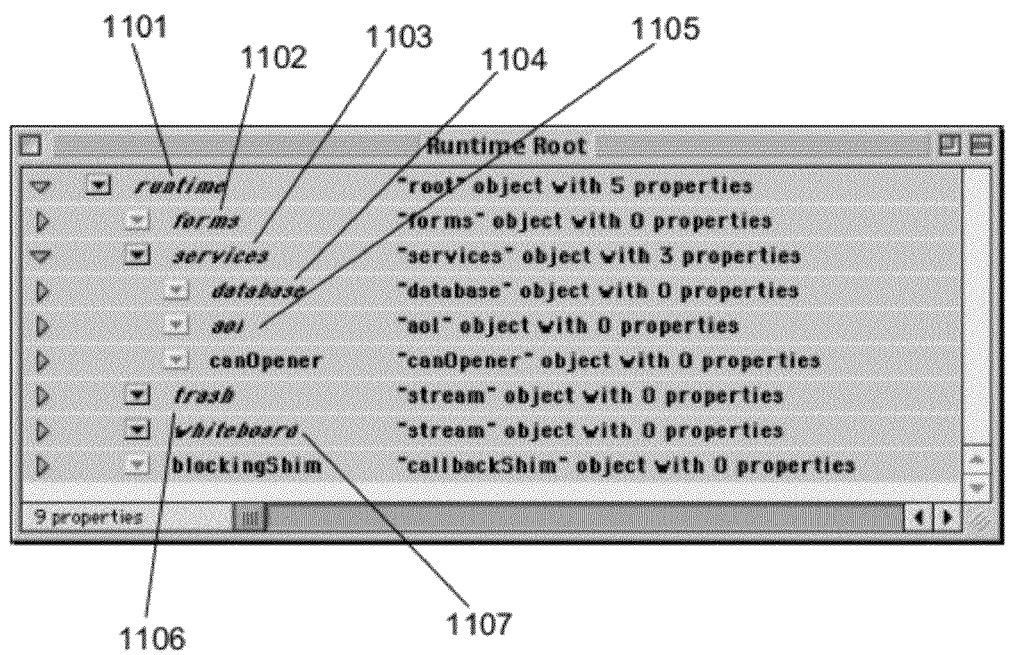
FIG. 11 is a schematic diagram of a root object according to the invention.

With respect to FIG. 11, in order for a form to be displayed or an object to receive messages it must by owned by an object known as the runtime 1101. The runtime is an object of class "root" that serves as the origin of the hierarchy for all active objects.

The first object of interest is the form stack, forms 1102. When the runtime displays a "form" object, it takes ownership of the new form by placing it in the form stack. The form's UI widgets will be created and displayed (if the Boolean property, visible, is true). After all the widgets have been created, the runtime will send the form a "displayed" message so the form can perform any actions immediately after being displayed. From this point on, the form has the ability to send and receive messages as long as it is owned by the runtime.

The services object 1103 provides access to a many features that can be registered at runtime. One service that it provides by default is the database object 1104, which offers persistent storage. The database can be used to save preferences, high scores, or other data that should be kept from session to session like the user's portfolio or address book.

The aol object 1105 under services 1103 acts as the connection to the host. Messages requesting data from the server will all be sent to the aol object 1105 with the appropriate message name corresponding to the request. For instance, the stock quote in FIG. 10 was a response to a message named "getStockQuote" sent to aol.

The trash object 1106 acts as a temporary resting place for deleted properties and locally created objects. The contents of the trash object 1106 will not be deleted until all scripts have completed execution because deleted properties might be referenced by another suspended or blocked script.

The whiteboard object 1107 also acts as temporary storage for communication between forms, but the lifetime of its contents is governed by a different mechanism. One of the built-in properties of a form object is a Boolean called keepWhiteboard. The runtime deletes the contents of the whiteboard object 1007 any time the runtime displays a form that has keepWhiteboard set to false. This allows data to be passed from form to form as long as the next form is expecting it. (i.e. keepWhiteboard is true.)

Script Overview

On the client device, the application presents features and services to the user by using forms. As discussed above, the forms contain UI widgets, such as text fields, check boxes, pop-up menus, and buttons. Once the user interacts with a widget by clicking a button, changing text, or selecting an item in a list, the form needs to act on that event. It does so by sending a message to the appropriate widget, but that doesn't accomplish anything in itself. The widget needs to have a script that corresponds to the message that is being received. For example, a button receives an "action" message when the user clicks it. If the button widget has a script property called action, that script will be executed to handle the "action" message. Similarly, if that script sent a "load" message to aol to get a stock quote, then a reply message called "reply" will be sent back to the button which can handle the response with a script called reply which might display selected properties from the quote such as the current price.

The scripts are the form's logic component which give the client intelligent behavior. By creating new forms on the server, the client can get new or updated functionality simply by loading the form and displaying it. This type of flexibility shortens the development cycle of the client and increases its longevity by adding to its feature set after the client has been released.

Script Basics

In order to begin programming Script, the scriptwriter must be familiar with the conventions of representing data, variables, and expressions. The next few sections will define the constructs of the language and show simple examples of how to use them.

Being able to reuse scripts will increase reliability and shorten the time required to develop new features. However, not all code is written elegantly, so Script allows you to comment your script using the double slash, as in C++.

```
// This is a comment
// each comment runs until the end of the line
.simpsonKidIQs = .iq.bart + .iq.lisa    // Maggie hasn't been tested yet!
```

There are also C style block comments. The notable difference is that block comments nest in Script. This is a significant change from C.

```
/* This is a comment
   that can span
   several lines */
/* Because block comments nest /* this comment won't end the block */
   Instead you have to balance the end of the blocks with a closing
   Comment marker. --> */
```

Literal values for integers, Booleans, and strings are represented as follows:

```
.lisa.age = 8                      // Lisa in eight years old
.lisa.says = "I'm going to my room"   // Time to do homework
.lisa.likesSchool = true           // She seems to
.bart.age = 0xa                    // Bart is ten
.bart.says = "Ay Carumba!"         // What else would he say
.bart.likesSchool = false          // gonna be a rock star...
```

The newline keyword can be used to append a carriage return onto a string value.

```
.homer.excuse = "Doh!" & newline & "It was like that when I got here"
// The string will appear as
//   Doh!
//   It was like that when I got here
```

It is also possible to use escape sequences in strings with the back slash '\' followed by 'n' for new line, 't' for tab, or 'x' followed by a two digit hexadecimal value.

```
.homer.excuse = "Doh!\n\tIt was like that when I got here\x2a"
// The string will appear as:
//   Doh!
//      It was like that when I got here*
```

The statements in Script are terminated by carriage returns. There are no semicolons in the language. In fact, the lexer will gag on the first errant punctuation it runs across. However, if the statement gets too long, it can be continued on the next line by putting the backslash as the last character on that line.

```
.homer.profile = "Springfield Nuclear Power Plant safety inspector" &
",bowler" & \", beer drinker" & ", astronaut" // that was
just too much for one line to take
```

That should be enough for starters, but in order to access data we need to know how to follow a path in the hierarchy to a given property.

Identifiers and Paths

Scripts allow access to values such as strings, integers, and Booleans that can be stored in properties, which exist in the form, database, or whiteboard. Alternatively, values can be placed in temporary variables that only exist during the execution of the script. Temporary variables must begin with a letter or underscore and can be followed by any sequence of letters, underscores, or digits.

```
BartAge = 10                       // sets the variable BartAge to the
                                   // integer 10
_santasLittleHelper = true         // the dog
Simpson5 = "new band"              // this is fine
5donuts = "Homer's breakfast"      // illegal, cannot begin with a digit
```

Path are the means of specifying a location of a property in the hierarchy. The period is the path separator similar to a slash being the directory separator in Unix. The basic path components are explicit names, indices, or name expressions.

Figure 12:
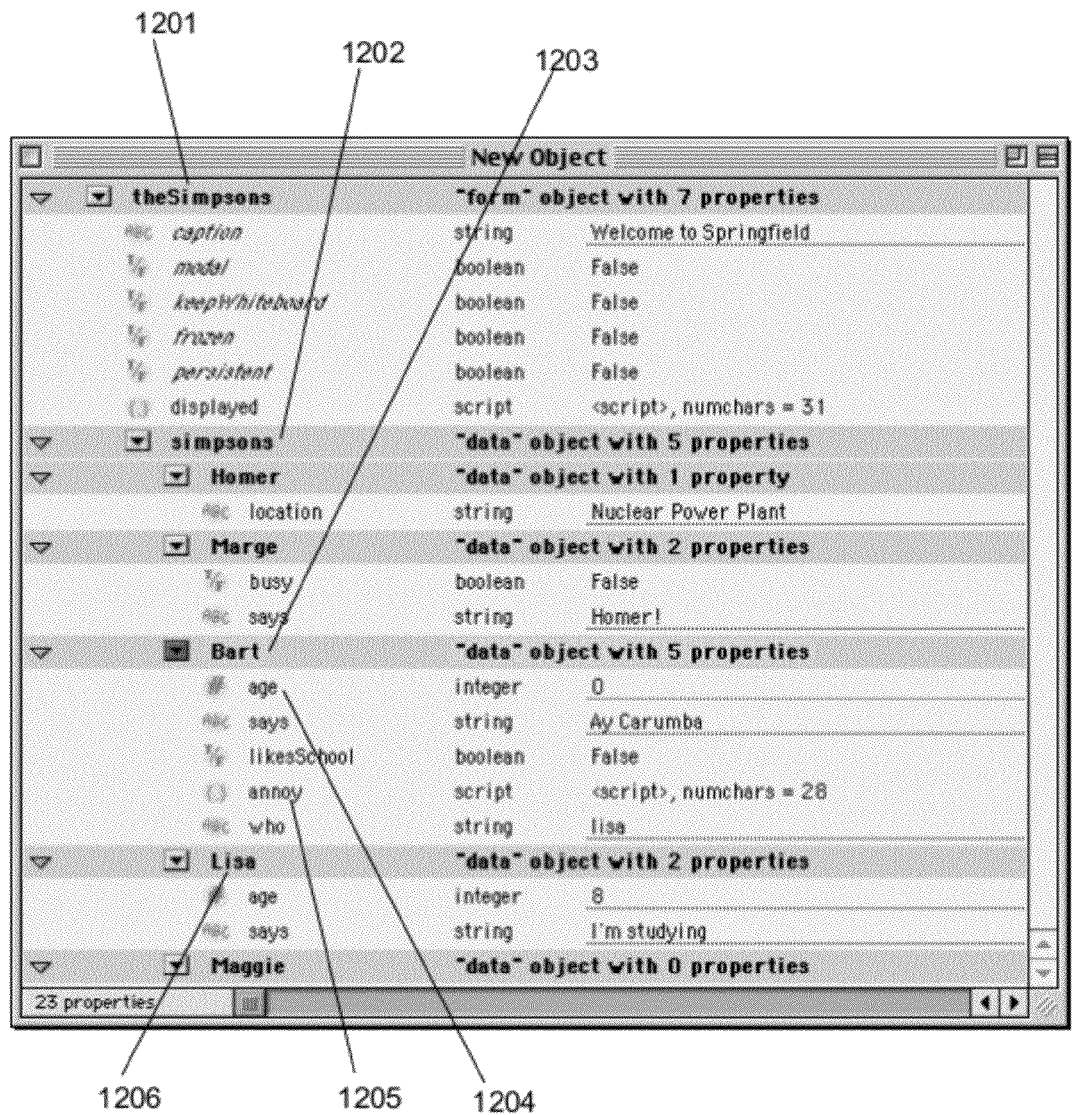
FIG. 12 is a schematic diagram of a form object containing data and logic objects according to the invention.

Referring to FIG. 12, Bart's age 1204 could be set with the following expression

```
me.simpsons.Bart.age = 10        // sets the age to 10
.simpsons.Bart.age = "10"        // A string automagically converts to int
.simpsons.bart.AGE = 0xa         // This is 10 too
form.simpsons.Bart.age = 10      // an absolute path
```

Each of these expressions set Bart's age property to a value of 10. The first expression starts with me, which begins the path in the same object that contains the script. In this case the form object, theSimpsons 1201 contains the script. Following from there, the form owns the simpsons data object 1202, which owns Bart 1203 which owns age 1204.

The second expression uses a shorthand form of me by beginning the path expression with a period. The third expression shows that paths are not case-sensitive. The last path is not relative to the script, but starts with at the top of the form, theSimpsons 1201.

Now consider the annoy 1205 script in Bart 1203. In order to change a property in Lisa 1206 relative to Bart 1203 the path needs to move up the hierarchy. It can do so in the following ways:

```
form.simpsons.Lisa.says = "Bart, quit it!"    // absolute path
parent.Lisa.says = "Bart, quit it!"           // backs up to simpsons first
..Lisa.says = "Bart, quit it!"                // this is shorthand for parent
```

Everything is the same as before, but the parent (or "...") path component causes the path to ascend the hierarchy one level from the current position, or from the object that contains the script if it appears as the first part of a path.

Another way to access elements of a path is to use the index of the property. In a path, the square bracket operator is used to reference properties by index.

```
Form.simpsons[1].location = "Moe's"   // sets simpsons.Homer.location
form.simpsons[2].busy = true          // sets simpsons.Marge.busy = True
form.simpsons[3][1] = 10              // sets simpsons.Bart.age to 10
```

Another convenient way to access a property is by name using an expression. This allows the script to operate on different properties at runtime without having to directly modify the script. Use the parenthesis preceded by a period or the curly braces to use an expression as a path name. For example, from Bart.annoy:

```
                            // .who = "marge"
parent.(.who).says = "go outside and play"  // parent.marge.busy = true
                            // .who = "lisa"
parent{.who}.says = "leave me alone" //
```

There are also several prefixes that denote special objects in Script. They appear in the table below.

PATH PREFIXES AND SPECIAL OBJECTS

| | |
|---|---|
| me or "." | The object containing the script. |
| parent or ".." | The parent of the object containing the script. |
| form | The form containing the script. |
| params | The parameter object of the message that invoked the script. |

PATH PREFIXES AND SPECIAL OBJECTS

| | |
|---|---|
| whiteboard | A special location for storing data for inter-form communication. The keepWhiteboard property of the most recently displayed form governs lifetime of data. |
| database | Persistent storage for preferences, hi scores, and state information between sessions. |
| formstack | The object that contains all currently displayed forms. |
| error | The error object can only be referenced in a catch block. It contains a string property (message) and an integer property (type). |
| eparams | The object in a reply message containing the echo parameters included in the original request message. |
| services | The services object in the runtime. Usually unnecessary because the VM will check the services object for any path that it can't resolve. |

Expressions and Operators

The most common operation in Script is computing the value of an expression. Expressions are written using operators familiar to most programmers and scriptwriters. The operators "*", "/", "+", and "−", are used for multiplication, division, addition, and subtraction, respectively. The "=" operator pulls double duty in the language, acting as both the assignment operator and the equality operator.

```
.homer.job = "nuclear engineer"    // assigns a string to .homer.job
if .homer.job = "office assistant"
    // this doesn't assign "office assistant" to .homer.job
    // instead, the equals operator does a case insensitive
    // compare on string values
end
```

Unlike C and C++, Script is not a strongly typed language. When an integer is assigned to a string property, Script promotes the integer to a string. If a string value that represents an integer is assigned to an integer property, the string will be converted to an integer before the assignment. If a string does not represent a base ten number, then it will be treated as an integer value of zero. When converting from Boolean, string values are "True" and "False" and integer values are 1 and 0. When converting to a Boolean, only the case-insensitive string value "false" and the integer value 0 will be treated as false. All other values for strings or integers are true.

```
HalfDozen = "6"                           // A local variable
.homer.donutsEaten = "none"               // donutsEaten is a string property
.homer.donutsEaten = 6 + halfDozen
        // converts to an int (6+6=12) then back to a string = "12"
.homer.donutsEaten = .homer.donutsEaten + 1
        // now a baker's dozen "13"
.donutCount = 5 + "fistful more"          // this is like 5 + 0
.homer.hungry = true                      // hungry is a Boolean property
.homer.hungry = "true"                    // this converts to true
.homer.hungry = 1                         // this is also true
.homer.hungry = "false"                   // this is False!
```

If the left hand side of an assignment is a property that doesn't exist, that property will be created as the apparent type of the expression and assigned the value of the expression.

```
.homer.job = "safety inspector"
    // only the .job property will be created.
    // if .homer doesn't exist that is always an error!
```

As expected the typical rules of precedence apply.

```
.doh = 4 + 3 * 2           // = 10
.doubleDoh = (4 + 3) * 2   // = 14
.dohAgain = 6 + 4 / 2      // = 8
.fuguFish = (6 + 4) / 2    // = 5
```

The string concatenation operator, "&" is particular to Script. It can be used to append on string to another.

```
.homerSays = "D" & "oh" & "!" // "Doh!"
.homerSays = .homerSays & " We are out of donuts!"
    // "Doh! We are out of donuts!"
```

The logical operators are words, rather than symbols, with the exception of the logical not, which can be written as either "not" or "!".

```
.homer.hungry = not .homerSleeping    // if Homer is awake, he's hungry
.homer.hungry = ! .homerSleeping      // just like I said
.homer.sleeping = .noDonuts and .remoteControlMissing
    // if no donuts and can't change the channel, he will sleep
.homer.annoyed = flander.ned.present or (.noDonuts and \
    ! .homerSleeping) // he is easily annoyed
```

The comparison operator "=" will try to convert its operands to integers, but if both left and right operands are strings, it will perform a case-insensitive compare.

Certain operators may be used in conjunction with the assignment operator to simplify expressions.

```
.Bart.playtime += .bart.studytime // adds studytime to playtime
    // same as .Bart.playtime = .Bart.playtime + .bart.studytime
```

Also, increment and decrement operators can be used as statements, but not on an expression level.

```
// all the same...
.homer.donutsEaten++
++.homer.donutsEaten
.homer.donutsEaten += 1
.homer.donutsEaten = .homer.donutsEaten + 1
// not legal!
.homer.donutsEaten = .donutCount-- // not an expression level operator
```

The complete list of operators, listed in order of precedence, follows:

| Operator | Description |
| --- | --- |
| ( ) | Parenthesis. Higher precedence |
| +, −, not (same as "!") | Unary plus, minus, logical not |
| * / % | Multiplication, division, modulus |
| + − | Addition, subtraction |
| < > <= >= | Less than, greater than, LTE, GTE |
| = != | equal, not equal |
| & | String concatenate |
| and | Logical and |
| or | Logical or |
| *=, /=, %=, +=, −=, &= | Operation assignment |
| *=, /=, %=, +=, −=, &= Statement Operators | RHS evaluated first, then op assign |
| ++, −− | Pre or postfix increment and decrement |

Conditional Statements

Script has conditional statements like other languages, but the statement block needs to be terminated by the keyword end.

The grammar is:

```
if expression
    statements
end
```

Note: examples of this form of conditional statement are:

```
if .homer.atHome
    .donutCount = .donutCount −1
    // decrease every time Homer returns
end
if .bart.inTrouble
    .bart.location = "Principle Skinner's Office"    // just like home
    .marge.grayHair = .marge.grayHair + 1            // might be blue hair...
end
```

An else clause might also be added to the if statement before the keyword end as follows:

```
if expression
    statements
else
    statements
end
```

Examples of this syntax are:

```
if .duffCount > 0
    .duffCount = .duffCount − 1    // don't mind if I do
else
    .homer.location = "Moe's Tavern"    // store is too far
end
if .lisa.homework = true
    .lisa.busy = "studying"             // highly motivated
else
    .lisa.busy = "playing saxophone"    // and well-balanced
end
```

One significant different between conditional statements in Script and C/C++ is that multiple Boolean expressions will not be short-circuited. The bytecodes generated by evaluating the entire expression are much smaller than inserting a check after each Boolean operator followed by a conditional jump. This means that:

```
if exists(.foo) and (.foo > 5)
    // careful! (.foo > 5) will ALWAYS be executed
    // resulting in a thrown exception if it doesn't
end
```

Also, any number of conditional statements may be chained together using the following syntax:

```
if expression
    statements
else if expression
    statements
end
```

Such as:

```
if .time = "5:00PM" // this works as a case-insensitive string compare
    .homer.busy = "going home"
else if .time = "3:00PM"
    if .homer.location = "work"
        .homer.busy = "napping"
    else
        .homer.busy = "watching TV"
    end // terminates the inner if
end // terminates the whole if/else if block
```

Loops

Script offers several constructs to facilitate iteration over a block of statements. The first form of iterator executes the loop a fixed number of times with the following syntax:

```
repeat integer_expression
    statements
end
```

Some examples are:

```
repeat 99
    .homer.drink(.duffCount)    // calls the drink script 99 times
end
repeat .donutCount              // does NOT decrement .donutCount
    .homer.eat( )               // calls the eat script
end
```

The second type of loop statement will continue executing as long as an expression is true or as long as it is false.

```
repeat while boolean_expression
    statements
end
repeat until boolean_expression
    statements
end
```

Examples of this are:

```
repeat while .lisa.homework
    .lisa.homework = .lisa.study( )
    // returns false if there is no more homework
end
repeat until .quittingTime
    .homer.checkNuclearSafety( )      // that's what I'm here for
    .homer.checkVendingMachine( )     // need some pork rinds
    .quittingTime = .home.checkClock( ) // done at 5:00
end
```

Perhaps the most familiar form of loop statement is one that uses an iteration variable and sets a beginning and ending limit as follows:

```
repeat with identifier = integer_expression [down] to integer_expression
    statements
end
```

The boundary expressions will only be evaluated once, at the beginning of the loop. This can either count from a lower bound to an upper bound or from an upper bound to a lower bound if the down keyword is used.

```
.count = 0
repeat with i = 1 to 10
    .count = .count + i // sum the numbers from 1 to 10
end
foward = "Smithers"
backward = ""
repeat with k = length(forward) down to 1
    // reverses the string
    backward = backward & getChar(forward, k)
end
// backward = "srehtimS"
```

Similar to C or C++ there are also statements to continue on to the next iteration of the loop or break out of the loop completely. As fate would have it, these are the "continue" and "break" statements, respectively. They can appear inside any loop statement.

```
repeat with k = 1 to 10
    if ! .lisa.homework
        break;           // done with study loop
    else if .lisa.nextTopic( )
        next;            // don't study this time, just rest
    end
    .lisa.study( )       // going for straight A's
end
```

The last type of loop statement touches all the properties owned by a given object and all of the children below it to an optionally specified depth. If the depth option is not specified then only the immediate children of the object will be visited. Alternatively, if all nested properties at arbitrary depths need to be visited this can be accomplished by using the infinity keyword. Lastly, the properties can be filtered using the objectsOnly keyword. This will skip other properties and only iterate over objects.

```
repeat with identifier in path [to depth {integer_expression | infinity}]
    [objectsOnly] statements
end
```

If the script was intended to set all the .busy properties of the simpsons to "sleeping" in FIG. 6. it could be done with the following loop.

```
repeat with person in form.simpsons to depth 1 objectsOnly
    // every simpson must rest
    person.busy = "sleeping"
end
```

This can be simplified by noting that all the properties contained in forms.simpsons are object, so the objectsOnly filter is not necessary. Also, because the default iteration depth only visits the immediate children of the starting object, the depth does not need to be set to a value of one.

```
// this will also put every one to sleep exactly like
// the example above.
repeat with person in form.simpsons
    // every simpson must rest
    person.busy = "sleeping"
end
```

Arrays

The invention provides an array property that allows for efficient handling of large blocks of homogeneous data. The type of information that can be stored in an array is limited to string, integer, or Boolean values. The array can be created using the following syntax:

```
create array of {int|string|bool} as path
// The type of the array is specified when it is created
```

The path can be a local variable or a path to the desired location in the hierarchy including the name of the array property to be created.

```
create array of string as form.simpsons.Homer.excuses
// creates an array of strings in the Homer objects called "excuses"
```

Now that the array has been created, there needs to be a means of adding elements to the array. Creating new elements in an array is accomplished with the insert statement that has the following syntax:

```
insert expression in path at int_expression
```

The insert statement will create a new element of the same type of the array, with a value specified by expression at the index given by int_expression. The array is one based, rather than C/C++ style zero based arrays. Hence, if zero is given as the index for the insertion, it will result in an append operation.

```
lameExcuses = form.simpsons.Homer.excuses // save path in local var
insert "I don't know!" in lameExcuses at 1 // add excuses
insert "It was like that when I got here!" in lameExcuses at 1
insert "How should I know?" in lameExcuses at 2
insert "Don't ask me." in lameExcuses at 0 // 0 index does append
// results in the following array
// "It was like that when I got here!"
// "How should I know?"
// "I don't know!"
// "Don't ask me."
```

Elements of the array can be accessed with the bracket operator "[ ]". LameExcuses[2]="I didn't do it!"//replaces "How should I know" Individual elements of the array can be removed with the delete statement as detailed below.

Dealing with Properties and Objects

Accessing the contents of individual properties can be accomplished by evaluating a path to that property, but what happens if you want to move or delete a property, or even duplicate an entire object? Script has statements specifically for those kinds of operations.

In order to delete an object, property, or array element use the delete statement. In the case of a property, this will actually move the property or object specified by path to the trash object until all scripts have completed execution. This is necessary to prevent a script from holding on to a reference to a property that no longer exists, or even worse, to prevent disaster when the script deletes itself or the object in which it is contained.

```
delete path
delete .homer.job        // removes the job property from .homer
detele form.simpsons     // they are leaving Springfield
```

The delete operator can also be used with elements in an array. Unlike deleting a property, the array element will be removed immediately without being placed in the trash. Use the bracket "[ ]" operator to specify which element of the array should be deleted.

```
//from the example above...
delete form.simpsons.Homer.excuses[2]
// removes "I didn't do it!" from the array
```

Use the copy statement to copy a property or object from one location to another by specifying the source path and a destination path. Optional parameters to the copy instruction are destination name, which is a string expression that will be used to rename the property in the new location, and a destination index, an integer expression that can be used as the index at which the property should be inserted into the hierarchy. The original property name will be used if a destination argument isn't supplied. Similarly, the property will be copied to the object after all properties that currently contained by the object. Either of these optional parameters may be omitted, but if both occur they must be used in the order shown.

```
copy source_path to dest_path <as dest_name> <at dest_index >
// copy the homework property to bart without changing the name
.lisa.homework to .bart
// copy the location property to homer and rename it destination
```

```
    copy .donuts.location to .homer as "destination"
    // copy the location property to homer as the third property
    copy .donuts.location to .homer at 3
```

The copy statement will not overwrite a property or object if it already exists in the destination object. In that case, the script must delete the property at the destination path before copying the new property.

Use the move statement to place a property somewhere else in the hierarchy. The syntax and function is similar to the copy statement except that the original property or object will no longer exist in its former location.

```
    move source_path to dest_path <as dest_name> <at dest_index >
    // move the porkchop property from the microwave to homer
    // renaming it as dinner
    move .kitchen.microwave.porkchop to .homer as "dinner"
    // the cash property will be renamed allowance and owned by bart
    move .homer.wallet.cash to .bart as "allowance"
```

Each of the previous three statements will work with either simple properties (strings, integers, Boolean, scripts, or aliases) or objects. Making an assignment to a path that has a final property that does not exist will create a simple property, but an object cannot be automatically generated by the same means. Objects are created via the create statement by supplying the class name of the desired object and a path and name of the object to be created.

```
    create "class_name" as dest_path
    // create a new button at the top level of the form
    create "button" as form.newButton
    // create a data object called Flanders for Ned and family
    create "data" as form.neighbor.Flanders
```

Dealing with long paths might be cumbersome and prone to errors so one final feature of Script provides the scriptwriter with the ability to make a shortcut of complex paths. By assigning a path of an object to a local variable, the variable becomes a means of accessing the properties contained in the path. This improves performance by not re-evaluating the path every time the variable is used.

```
    pet = form.Springfield.simpsons.santasLittleHelper
    // pet now refers to santasLittleHelper
    repeat .bart.freetime
        // bart plays with the dog when not busy
        pet.playtime = pet.playtime + 1
        // check to see if the pet has played enough
        if pet.tired( )
            // don't wear the little guy out
            break
        end
    end
```

Shortcuts display a unique quality in that they will follow an object even if that object is moved to another point in the hierarchy.

```
    pet = form.Springfield.simpsons.santasLittleHelper
    // pet now refers to santasLittleHelper
    move pet to form as "lostPet"
    // now the object has been moved and renamed as lostPet
    if for form.Springfield.simpsons.santasLittleHelper.tired( )
        // this object got moved so this path isn't valid
        // which will throw an exception
    end
    if pet.tired( ) // now calls form.lostPet.tired
        pet.goHome( )
    end
```

Calling Scripts and Sending Messages

Many times a script will handle a message that it receives from a widget, such as an action script handling the message that a button was clicked or a timer expired, but often those scripts will rely upon other scripts to perform some of the work. Also, requests to the server for data and forms are often written in the form of a function call. A function call uses the following syntax:

script_path([parameters] [echo echoParameters] [options optionParameters])

The act of calling a script actually constructs a NACHOS message with the name of the call and sends it to the object specified by the path.

Referring back to FIG. 11:

```
    form.simpsons.Bart.annoy( )    // calls the annoy script
        // which actually creates an annoy message and sends it
        // to the object called "Bart"
```

The last component of this function call, annoy, is actually the name of the script or the message being sent.

Many calls will only have parameters without the additional echo parameters or message options. The recipient of the message can examine these parameters. For instance, in order to get a stock quote we can make the call:

quote=aol.getStockQuote(sym:"aol")

In the example above, aol is object that handles the message "getStockQuote". Additionally, we see the first example of naming parameters. The parameter list to a function is a comma-separated list of expressions. Each expression may be preceded by a name then a colon. In this case sym is the parameter name and "aol" is the value of the parameter. Actually, each parameter is created and copied by value as a property of the message object "getStockQuote", which is why the parameters should be named. This allows the handler of the message on the other side to refer to the parameters by name, rather than relying upon the order of appearance in the parameter list. If a name is not supplied, the parameter will be created as a property called "param".

Another example is:

database.save(path:"homerSimpson", stream:form.simpsons.homer)

This saves the homer object in the database as homerSimpson. The save message to the database requires two parameters: path, the path in the database to save the property, and stream: a path to an object or property which will be saved. Because these parameters are named, the order can be reversed without consequence.

```
database.save(stream:form.simpsons.homer, path:"homerSimpson")
// same as the above call
```

Some message will need to define additional options to specify things such as whether the message should be encrypted, or how long the system should wait before it times out the message due to not receiving a response. These parameters can be put in the options block of the message.

```
aol.sendPrivateMessage(dest:myBuddy, message:text, \
                       options encrypt:true)
```

This will allow the native implementation a chance to deal with options before sending the message. The only option handled by the kernel is "timeout" which specifies in milliseconds how long the kernel should wait for a response before throwing an exception. The echo parameters are used for asynchronous messages as discussed below.

All simple properties (e.g., string, integer, Boolean, binary, script) are passed by value rather than by reference. Objects are usually passed aliases, which acts as an implicit reference. Modifying properties contained in the object received as a parameter will modify the original object. If a message containing aliases leaves the local hierarchy, such as a request sent to the host, then aliases in the message will be replaced with a copy of the object referenced by the alias. Most of the time this is the desired behavior, but this can still be overridden by using the @ operator.

```
// saves a copy of 'me' in the database
database.save(path:"test1", stream:me)
// saves an alias to 'me' in the database
database.save(path:"test2", stream:@me)
```

Sometimes an object may already have code to respond to a message. If the object has such native code, which can respond to a given message, but also contains a script handler for the same message, the script handler will override the native code. Hypothetically, a native application might have code to handle a message called shutdowns, but a script might be used to intercept that message and determine if the caller has privileges to issue such a command. In this case, after confirming the privileges of the caller, the script may call the utility function, passMessage( ), which will abort the script at the point of the call and allow the object to handle the message with its native code.

Aliases have a special behavior when used as parameters in a message. If the recipient object of the message is local (i.e., the object lives somewhere under the same runtime root as the sender) then an alias property will be sent as an alias in the message. This happens because the recipient can resolve the alias to the object to obtain any properties owned by the object referenced by the alias. However, if the message is sent off the local environment, the alias property will be replaced by the object that it references. This can cause a dramatic increase in size of the message because the underlying object and all of the properties it contains will be copied to the message. In many cases, this is the desired effect, but if an alias should not be resolved when sent over the wire, it can be marked as a persistent alias with the @ operator.

```
aol.setUpdateListener(listener:@form.proxy)   // this will send an
// alias of the proxy object in the setUpdateListener message to the
// aol service, rather than an copy of the proxy object.
```

Blocking Calls

The default behavior of a function call is to block until the function that has been called returns. This allows the calling script to process the result directly rather than have another script handle the response. Referring back to FIG. 9. the last value of a stock quote can be displayed using the library routine debug( ) as follows:

```
debug(aol.getStockQuote(sym:"aol").stream.aol.lastValue)
debug("finished")
// output -
// 45.300000
// finished
```

There is a lot going on in that last statement. First, a get-StockQuote message is sent to the services.aol object. The script will wait until the response comes back before executing any more statements. Once the reply message returns, the suffix path, .stream.aol.lastValue, gets the desired data from the parameter object of the message. This is displayed using the library routine debug( ).

Asynchronous Calls

By placing the reserved word async in front of a function call, the script will send the message to the object and continue executing without waiting for a response. This is more like posting a message than calling a function. Generally this means that another script will handle the response to the message as well. The example above can be recreated using two scripts that send the message asynchronously and handles the response in another script.

```
// 1st script
async aol.getStockQuote(sym:"aol")
debug("finished")
// 2nd script - loadComplete
// contained in the same object that sent the request
// handles the response message
debug(params.stream.aol.lastValue)
// output -
// finished
// 45.300000
```

Notice that the first script displays "finished" instead of waiting for the response message.

Asynchronous calls present a problem not found with a blocking calls: the script handling the response is different from the script that initiated the request. Sometimes the script handling the response must know certain information pertaining to the original request in order to handle the response properly. In such a case, echo parameters facilitate the passing of information from the request to the response. Any parameters passed in the echo block will be moved to the message response and sent back. The echo keyword is used before the block or echo parameters as below:

```
async aol.ping(payload:..data echo timestamp: myServices.time( ))
// a hypothetical call to ping the server.
```

```
// the response would have the timestamp parameter as an
// echo parameter. Serveral pings could be sent asynchronously
// and the response round trip time could be determined as well
// as seeing if they came out of order
```

Echo parameters should be used judiciously because all echo parameters are sent round trip across the network.

Return Values

The return statement allows the script to terminate execution before reaching the end or pass a value back to the caller. Any expression following a return statement will be evaluated and its result will be returned to the script that called the one currently executing.

```
return               // terminate the script
return expression    // pass the value of expression back
```

Exception Handling

Script allows the scriptwriter to handle runtime errors in the script with try/catch blocks. The syntax is as follows:

```
try
    statements
catch
    statements
end
```

Any errors that occur between the try and the catch statement will cause the script to jump to the beginning of the statement list following the catch statement. Inside the catch block the script can reference a special object by specifying the path error. This object has an integer property, type, and a string property, message, which give the error number and a short description of the error, respectively.

```
try
    // .busy will be created if it doesn't exist, but...
    .homer.busy = .homer.study
catch
    // error if homer.study does not exist
    // error object only accessible within a catch block
    debug("*** error " & error.type & ":" & error.message)
end
```

Library Functions

The VM provides a set of built in functions for commonly used features such as string manipulation and random number generation. The names of these functions are case insensitive. However, unlike when sending messages or calling scripts, the parameters to these library functions aren't named, but rely upon the order of appearance in the argument list. Some of the parameters have default values as listed in the specification below. The default value can be overridden by including that parameter when calling that particular function. When two default parameters exist, the apparent type of the parameter is used to distinguish which value is being overridden. An example of this would be the find ( ) function with has a source string, a search pattern, a default starting position, and a default Boolean to ignore case. If only three parameters are listed in the call, then an integer value would specify the starting position while a Boolean would indicate case sensitivity.

Utility Functions

```
Void          beep(int count=1)
int count     The number of times to beep. Default value: 1
Description:  This function will call the system beep count times.
Example:      beep( )  // will beep once
              beep(3)  // will beep three times
Void          debug(string text)
string text   The text to be displayed.
Description:  This function will display text in the system window or debug log.
Example:      debug("hello")   // output -- hello
              debug("are you " & "there") // are you there
Void          gotoURL(string url)
string url    The URL string to be sent.
Description:  This function will convert url to a NACHOS message and send it to
              services.aol. The url might specify the name of the message and its
              parameters, but it will be constructed as a load message if url specifies
              no name. This can be used to load a new form onto the form stack.
Example:      gotoURL("nachos://aol/quoteform")    //loads the
              // form "quoteform" onto the form stack
              gotoURL("nachos://aol/getstockquote&sym=aol")
              // sends a "getStockQuote" message with the "sym"
              // parameter set to "aol"
Void          throw(string error)
string error  The text string that will be accessible from the error object in a catch block
Description:  Throws an exception that will abort the current script and all calling scripts
              until a catch block deals with the message or the thread is terminated due
              to the thrown exception. The text can be obtained in a catch block by
              using error.message.
Example:      throw("you toss, you catch")   // will beep once
              throw("illegal parameter") // will beep three times
void          passMessage( )
Description:  Terminates the current script and passes the message, which spawned
              the script to the native object code. This can used to filter messages with
              a script prior to having the object respond to the message with its native
              code.
Example:      passMessage( )   // let the object handle it
void          yield( )
```

| | |
|---|---|
| Description: | This allows a script to pass control to another thread or let new threads spawn to handle queued user input. It isn't a good idea to write scripts with endless loops, but putting a yield statement in a long loop will keep the VM from killing the thread by exceeding the time check for an endless loop. |
| Example: | yield( )    // let another script handle messages |
| void | sleep(int milliseconds) |
| Description: | This will cause the script to block, but will prevent it from timing out. As soon as the specified time elapses, the script will resume execution at the next statement. |
| Example: | sleep(1500)    // block script for 1.5 seconds |
| property | loadURL(string url) |
| string url | The URL string to be sent. |
| Description: | This function will convert url to a NACHOS message and send it to services.aol. The url might specify the name of the message and its parameters, but it will be constructed as a load message if url specifies no name. The result of this call will be passed back to the script. |
| Example: | X = loadURL("nachos://aol/quoteform")    //loads the<br>// form "quoteform" into the variable x |

Math Functions

| | |
|---|---|
| int | abs(int value) |
| int value | An integer value. |
| Description: | Returns the absolute value of the argument value. |
| Example: | abs(val) // if val=3, returns 3 |
| | abs(val) // if val=−3, returns 3 |
| int | min(int valA, int valB, ...) |
| int valA | An integer value. |
| int valB | An integer value. |
| int ... | Additional integer values. |
| Description: | Returns the minimum number from the set valA, valA, ... |
| Example: | min(2, 7)           // returns 2 |
| | min(0, 5, 3 −1) // returns −1 |
| int | max(int valA, int valB, ...) |
| int valA | An integer value. |
| int valB | An integer value. |
| int ... | Additional integer values. |
| Description: | Returns the maximum number from the set valA, valA, ... |
| Example: | max(2, 7)           // returns 7 |
| | max(0, 5, 3 −1) // returns 5 |
| int | random(int min=1, int max) |
| int min | An integer specifying the minimum value for the range returned by random. If omitted, the default value is 1. |
| int max | The largest value that random will return. |
| Description: | Returns a random value between min and max, inclusive. |
| Example: | random(100) // returns a value from 1 to 100 inclusive |
| | random(10, 20) // returns a value from 10 to 20<br>// inclusive |
| int | pin(int value, int min, int max) |
| int value | An integer value. |
| int min | Lower bounds for value. |
| int max | Upper bounds for value. |
| Description: | Returns min if value is less than min, max if value is greater than max or value otherwise. |
| Example: | pin(7, 1, 10)   // returns 7 |
| | pin(7, 10, 20) // returns 10 |
| int | power(int value, int exponent) |
| int value | An integer value. |
| int exponent | An integer that will be used as the exponent. |
| Description: | Returns value raised to exponent. |
| Example: | power(2, 3) // returns $2\char`^3 = 8$ |
| | power(3, 4) // returns $3\char`^4 = 81$ |

Property Functions

| | |
|---|---|
| Int | propertyCount(path property) |
| path property | A path to a property in the hierarchy or an array. |
| Description: | Returns the number of properties contained in the top level of the object, property, or 0 if property does not specify an object. This does not recursively count all the properties contained by other object in property. If the argument is an array, propertyCount returns the number of elements in the array. |
| Example: | propertyCount(form.data) // returns the number of<br>// properties contained in form.data.<br>propertyCount(form.myArray) // returns the number<br>// of elements in form.myArray |
| Int | count(path property) |
| path property | A path to a property in the hierarchy or an array. |
| Description: | This function is the same as propertyCount( ). See above. |
| Example: | count(form.data) // returns the number of<br>// properties contained in form.data.<br>count(form.myArray) // returns the number<br>// of elements in form.myArray |
| Int | indexOf(path property) |
| path property | A path to a property in the hierarchy. |
| Description: | Returns the index of the property in the object containing it. Returns zero if the property does not have a parent. |
| Example: | indexOf(form.persistent) // returns 5 (persistent<br>// is a built in property of form) |
| string | className(path objectProperty) |
| path property | A path to an object property in the hierarchy. |
| Description: | Returns the class name of the object. If the parameter is not an object, this function will return an empty string. |

| | |
|---|---|
| Example: | className(me) // returns the class name of the<br>// object which contains the script (e.g. "button") |
| Bool | exists(path property) |
| path property | A path to a property possibly in the hierarchy. |
| Description: | Returns true if property references a valid property in the hierarchy,<br>otherwise returns false. |
| Example: | exists(form.data.mine) // does this exist? |
| bool | isObject(path property) |
| path property | A path to a property in the hierarchy. |
| Description: | Returns true if property references an object property, otherwise returns<br>false if it is any other type of property. Note that the function will throw an<br>exception if property does not exist. |
| Example: | isObject(me.child) // is this a property? |
| string | name(path property) |
| path property | A path to a property in the hierarchy. |
| Description: | Returns the name of the property path rather than its value. |
| Example: | name(parent) // returns name of the parent object of<br>// the script. The object containing the current<br>// script is 'me'.<br>name(me.data[2]) // returns the name of the second<br>// property in the data object contained in 'me' |
| void | rename(path property, string newName) |
| path property | A path to a property in the hierarchy. |
| string newName | The new name of the property. |
| Description: | Attempts to change the name of the path property to newName. |
| Example: | rename(me, .caption) // renames the object containing<br>// the script to be the string contained in .caption<br>rename(me.data[2], "foo") // renames the second<br>// property in the data object contained in 'me'<br>// to be "foo" |

String Functions

Unlike the C/C++ library functions, the functions in this library do not modify the source string and all indices are 1 based rather than 0 based. Functions return the result of the operation, but the original arguments are left untouched. In many cases it will be necessary to assign the result back to the source string.

(e.g. .foo=replace(.foo, "apples", "oranges")

| | |
|---|---|
| int | length(string src) |
| string src | A string value. |
| Description: | Returns the number of characters that src contains. |
| Example: | length("Apple")         // returns 5<br>length("Bart and Lisa")     // returns 13 |
| string | Upper(string src) |
| string src | A string value. |
| Description: | Returns src with all lower case characters converted to upper case. |
| Example: | upper("Marge")         // returns "MARGE"<br>upper("Bart and Lisa")     // returns "BART AND LISA" |
| string | Lower(string src) |
| string src | A string value. |
| Description: | Returns src with all upper case characters converted to lower case. |
| Example: | lower("Marge")         // returns "marge"<br>lower("Bart and Lisa")     // returns "bart and lisa" |
| string | substring(string src, int start, int count) |
| string src | A string value. |
| int start | The index of the first character of the substring. |
| int count | The number or characters in the substring |
| Description: | Returns a substring of src beginning at start, containing count characters. |
| Example: | substring("Homer eats Nachos", 7, 4) // returns "eats"<br>substring("Bart and Lisa", 1, 4)    // returns "Bart" |
| string | getWord(string src, int n=1, string<br>delim=<whitespace>) |
| string src | A string value. |
| int n | The index of the desired word in the source string. |
| string delim | The set of characters used to delimit words in the source string. |
| Description: | Returns the n th word in src separated by any of the characters appearing in delim. |
| Example: | getWord("the middle part", 2)      // returns "middle"<br>getWord("Bart and Lisa", 2, " a")  // returns "rt"<br>getWord("Another sample")          // returns "Another" |
| string | removeWord(string src, int n=1, string<br>delim=<whitespace>) |
| string src | A string value. |
| int n | The index of the desired word in the source string. |
| string delim | The set of characters used to delimit words in the source string. |

| | |
|---|---|
| Description: | Returns the string src with the n th word and its trailing delimiter characters (delim.) removed. |
| Example: | RemoveWord("the middle part", 2)   // returns "the part" |
| | removeWord("Bart and Lisa", 2, " a")   // returns "Band Lisa" |
| | removeWord("Another sample")   // returns "sample" |
| int | countWords(string src, string delim=<whitespace>) |
| string src | A string value. |
| string delim | The set of characters used to delimit words in the source string. |
| Description: | Returns the number of words in src separated by any of the characters appearing in delim. |
| Example: | CountWords("Bart and Lisa")   // returns 3 |
| | countWords("Bart and Lisa", " a")   // returns 4 |
| | // the words would be "B", "rt", "nd", & "Lis" |
| string | insertString(string src, int n, string addStr) |
| string src | A string value. |
| int n | The index of src at which addStr will be inserted. |
| string addStr | A string to insert into src. |
| Description: | Returns a string composed of addStr inserted in src beginning at the nth character. |
| Example: | insertString("Homer likes Nachos", 6, " really") |
| | // returns "Homer really likes Nachos" |
| | insertString ("Bart and Lisa", 2, " a") |
| | // returns "B aart and Lisa" |
| string | remove(string src, int start, int count) |
| string src | A string value. |
| int start | The index of the first character to be removed. |
| int count | The number or characters to be removed |
| Description: | Returns the string src with count characters removed beginning at start. |
| Example: | remove"Homer really likes Nachos", 6, 7) |
| | // returns "Homer likes Nachos" |
| | remove("Spring in the field", 7, 8) |
| | // returns "Springfield" |
| string | getChar(string src, int n) |
| string src | A string value. |
| int n | The index of the desired character in src. |
| Description: | Returns the nth character in src. |
| Example: | getChar("Homer likes Nachos", 13)   // returns "N" |
| | getChar("Bart and Lisa", 10)   // returns "L" |
| string | setChar(string src, int n, string char) |
| string src | A string value. |
| Int n | The index of the desired character in src. |
| String char | The new character to be set at n. |
| Description: | Returns src with the nth character set to the first character of char. |
| | Passing a zero length string for char will effectively remove one character from src. |
| Example: | setChar("Homer likes Nachos", 13, "M") |
| | // returns "Homer likes Machos" |
| | setChar("Bart and lisa", 10, "L") |
| | // returns "Bart and Lisa" |
| string | removeTrailing(string src, string pattern, bool ignoreCase=true) |
| string src | A string value. |
| string pattern | The search pattern to remove. |
| bool ignoreCase | Boolean to make the search case insensitive. |
| Description: | Returns src with all trailing occurrences of pattern removed. |
| Example: | removeTrailing("Homer says, DOHdohdoh", "doh") |
| | // returns "Homer says, " |
| | removeTrailing("Homer says, DOHdohdoh", "doh", false) |
| | // returns "Homer says, DOH" |
| string | removeLeading(string src, string pattern, bool ignoreCase=true) |
| string src | A string value. |
| string pattern | The search pattern to remove. |
| bool ignoreCase | Boolean to make the search case insensitive. |
| Description: | Returns src with all leading occurrences of pattern removed. |
| Example: | removeLeading("DOHdohdoh, said Homer", "DOH") |
| | // returns ", said Homer" |
| | removeLeading("DOHdohdoh, said Homer", "DOH", false) |
| | // returns "dohdoh, said Homer" |
| int | compare(string srcA, string srcB, bool ignoreCase=true) |
| string srcA | A string value. |
| string srcB | A string to be compared with srcA. |
| bool ignoreCase | Boolean to make the search case insensitive. |
| Description: | Returns less than zero if srcA is less than srcB, greater than zero if srcA is greater than srcB, |

-continued

|  |  |
|---|---|
|  | 0 if the two strings are the same.<br>A shorthand form for a case insensitive compare can be performed using the "=" operator. |
| Example: | compare("HOMER", "homer") // returns 0<br>// if a Boolean is acceptable, then this is the same<br>// as "HOMER" = "homer"<br>compare("HOMER", "homer", false) // returns < 0<br>compare("homer", "HOMER", false) // returns > 0 |
| int | find(string src, string pattern, int n=1, bool ignoreCase=true) |
| string src | A string value. |
| string pattern | The search pattern. |
| int n | The character index at which to start the search. |
| bool ignoreCase | Boolean to make the search case insensitive. |
| Description: | Returns the index of the first occurrence of pattern in src that begins on or after the n th character of src. |
| Example: | find("Homer lives in Springfield", "spring")<br>// returns 16<br>find("Homer lives in Springfield", "spring", false)<br>// returns 0<br>find("Homer eats donuts for dinner", "er", 10)<br>// returns 27 ( the "er" in dinner ) |
| bool | startsWith(string src, string pattern, bool ignoreCase=true) |
| string src | A string value. |
| string pattern | The search pattern. |
| bool ignoreCase | Boolean to make the search case insensitive. |
| Description: | Returns true if src begins with pattern, otherwise false. |
| Example: | startsWith("Homer lives in Springfield", "homer")<br>// returns true<br>startsWith("Homer lives in Springfield", "homer", false)<br>// returns false |
| bool | endsWith(string src, string pattern, bool ignoreCase=true) |
| string src | A string value. |
| string pattern | The search pattern. |
| bool ignoreCase | Boolean to make the search case insensitive. |
| Description: | Returns true if src ends with pattern, otherwise false. |
| Example: | endsWith("Homer lives in Springfield", "FIELD")<br>// returns true<br>endsWith("Homer lives in Springfield", "FIELD", false)<br>// returns false |
| int | replace(string src, string pattern, string replace, bool ignoreCase=true) |
| string src | A string value. |
| string pattern | The search pattern. |
| string replace | The string which will replace the first occurrence of pattern. |
| bool ignoreCase | Boolean to make the search case insensitive. |
| Description: | Returns src with the first occurrence of pattern replaced by the string replace |
| Example: | replace("DOH doh doh!", "o", "*")<br>// returns "D*H doh doh!"<br>replace("DOH doh doh!", "o", "*", FALSE)<br>// returns "DOH d*h doh!" |
| Int | replaceAll(string src, string pattern, string replace, bool ignoreCase=true) |
| string src | A string value. |
| string pattern | The search pattern. |
| string replace | The string which will replace any occurrence of pattern. |
| bool ignoreCase | Boolean to make the search case insensitive. |
| Description: | Returns src with all occurrences of pattern replaced by the string replace |
| Example: | replace("DOH doh doh!", "o", "*")<br>// returns "D*H d*h d*h!"<br>replace("DOH doh doh!", "o", "*", FALSE)<br>// returns "DOH d*h d*h!" |

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A process for a framework architecture for client systems, comprising the steps of:
providing a server proxy client;
said server proxy client receiving a client information request from a client system;
said server proxy client determining the proper server to service said client request;
sending said client request to said proper server;
receiving said proper server's response to said client request; and
wherein said server proxy client acts as a proxy client for said client system, performing the bulk of data processing for said client system;
wherein said server proxy client updates said client system with raw data, presentation, and logic components using a universal data format, the raw data component comprising data retrieved from a server by said server proxy client in response to a client request;
wherein said server proxy client, upon receipt of a request for specific up to date presentation components from a client system, checks if the client system's original presentation components and/or executable bytecodes have expired;
wherein said server proxy client separates raw data and presentation components of said response and places said data into said universal data format,
wherein said raw data and said presentation components are sent independently by said server proxy client to said client system;
wherein said server proxy client receives presentation and logic component updates for said client system; and
wherein said presentation component updates are for a specific client device type;
wherein said logic component updates comprise updates to a common code base that is shared between different client device types, and which enables said server proxy client to control a feature set of said client system independently of an implementation supplied by native client code and without modifying said native client code; and
wherein said client system reuses at least a portion of said raw data component for other display purposes;
said method further comprising the step of:
said client system maintaining state information.

2. The process of claim 1, further comprising the step of:
providing a one-behind cache on said client system; and
wherein said client system checks said one-behind cache for any presentation or logic components relating to a user's request;
wherein if any components relating to a user's request exist in said one-behind cache, said client system checks if said components existing in said one-behind cache have expired;
wherein said client system uses said components existing in said one-behind cache to service the user's request.

3. The process of claim 2, wherein if said components existing in said one-behind cache have expired, said client system requests any current versions of the expired components from said server proxy client, wherein said server proxy client checks the current version of a requesting client's presentation and logic components, if any of the presentation and logic components require updating, then said server proxy client retrieves the latest version of any of the presentation and logic components and sends it to the requesting client, and wherein the requesting client stores the latest version of any of the presentation and logic components in said one-behind cache.

4. The process of claim 1, further comprising the step of:
sending said presentation and logic component updates to a client system.

5. The process of claim 1, wherein said client system uses said raw data and presentation components to create displays to a user.

6. The process of claim 1, further comprising the step of:
providing means on said server proxy client for saving a client system's state on storage device; and
wherein the saved client system's state allows said server proxy client to continue a client system's session when the client system changes connection methods to or loses coverage with said server proxy client.

7. The process of claim 1, further comprising the step of:
providing a scripting language;
wherein said logic component updates are written in said scripting language;
wherein said server proxy client compiles scripts written in said scripting language into executable bytecodes;
wherein said server proxy client updates said client system's features by sending said client system said executable bytecodes; and
wherein said client system executes said executable bytecodes in response to a user's input.

8. The process of claim 7, wherein a client system's presentation aspects are controlled using said scripting language.

9. The process of claim 1, wherein communication between said server proxy client and said client system is via a binary encoding of an XML data stream.

10. The process of claim 1 further comprising the step of:
caching data presentation components independently.

11. The process of claim 1, wherein said updates from said server proxy client to said client system are communicated using a single protocol.

12. The process of claim 1, wherein said server proxy client comprises a sole point of communication for said client system.

13. The process of claim 1, wherein said client system registers all presentation objects used by said client system.

14. The process of claim 1, wherein said raw data and presentation components are compartmentalized, wherein only said raw data or said presentation components needed by said client system are sent by said server proxy client to said client system.

15. The process of claim 14, wherein said client system uses raw data components for updated display purposes without receipt from said server proxy client of said presentation aspects.

16. The process of claim 15, wherein only raw data components are sent by said server proxy client to said client system.

17. A process for dynamically configuring client systems, comprising the steps of:
providing a host server;
providing a scripting language;
wherein said host server compiles scripts written in said scripting language into executable bytecodes;
wherein said host server, upon receipt of a request for specific up to date presentation components and/or executable bytecodes from a client system, checks if the client system's original presentation components and/or executable bytecodes have expired, wherein said host server separates response data into raw data, logic, and presentation components, the raw data component comprising data retrieved by said host server in response to a client request, and places said raw data component into said universal data format;

wherein only required elements of said client system in terms of:

said raw data component; said logic component; and said presentation component aspects are sent independently by said server proxy client to said client system if the original presentation component and/or executable bytecodes on the client system have expired;

wherein logic component updates comprise updates to a common code base that is shared between different client device types and which enables said server proxy client to control a feature set of said client system independently of an implementation supplied by native client code and without modifying said native client code;

wherein said client system reuses at least a portion of said raw data component for other display purposes; and wherein said client system saves state information.

18. The process of claim 17, wherein said scripts define program logic.

19. The process of claim 17, wherein said scripts create and control user interface displays.

20. The process of claim 17, wherein said client system receives requested network information from said host server separated into data and presentation components.

21. The process of claim 17, wherein said client system registers all presentation objects used by said client system with said host server.

22. An apparatus for a framework architecture for client systems, comprising:

a server proxy client;

said server proxy client for receiving a client information request from a client system;

said server proxy client determining the proper server to service said client request;

sending said client request to said proper server;

receiving said proper server's response to said client request; and sending presentation and logic component updates to said client system;

wherein said server proxy client acts as a proxy client for said client system, performing the bulk of data processing for said client system;

wherein said server proxy client, upon receipt of a request for specific up to date presentation components from a client system, checks if the client system's original presentation components and/or executable bytecodes have expired;

wherein said server proxy client updates said client system with raw data, said presentation, and said logic components using a universal data format;

wherein said server proxy client separates raw data and presentation components of said response and places said raw data component into said universal data format, wherein said raw data and said presentation components are sent independently by said server proxy client to said client system;

sending said raw data component to said client system;

wherein said server proxy client receives presentation and logic component updates for said client system;

wherein said presentation component updates are for a specific client device type;

wherein said logic component updates comprise updates to a common code base that is shared between different client device types and which enables said server proxy client to control a feature set of said client system independently of an implementation supplied by native client code and without modifying said native client code;

wherein said client system reuses at least a portion of said raw data component for other display purposes; and saving state information on said client.

23. The apparatus of claim 22, further comprising:

a one-behind cache on said client system;

wherein said client system checks said one-behind cache for any presentation or logic components relating to a user's request;

wherein if any components relating to a user's request exist in said one-behind cache, said client system checks if said components existing in said one-behind cache have expired;

wherein said client system uses said components existing in said one-behind cache to service the user's request.

24. The apparatus of claim 23, wherein if said components existing in said one-behind cache have expired, said client system requests any current versions of the expired components from said server proxy client, wherein said server proxy client checks the current version of a requesting client's presentation and logic components;

if any of the presentation and logic components require updating, then said server proxy client retrieves the latest version of any of the presentation and logic components and sends it to the requesting client, and wherein the requesting client stores the latest version of any of the presentation and logic components in said one-behind cache.

25. The apparatus of claim 22, further comprising:

sending said presentation and logic component updates to a client system.

26. The apparatus of claim 22, wherein said client system uses said raw data and presentation components to create displays to a user.

27. The apparatus of claim 22, further comprising:

said server proxy client for saving a client system's state; and wherein the saved client system's state allows said server proxy client to continue a client system's session when the client system changes connection methods to or loses coverage with said server proxy client.

28. The apparatus of claim 22, further comprising:

a scripting language;

wherein said logic component updates are written in said scripting language;

wherein said server proxy client compiles scripts written in said scripting language into executable bytecodes;

wherein said server proxy client updates said client system's features by sending said client system said executable bytecodes; and wherein said client system executes said executable bytecodes in response to a user's input.

29. The apparatus of claim 28, wherein a client system's presentation component is controlled using said scripting language.

30. The apparatus of claim 22, wherein communication between said server proxy client and said client system is via a binary encoding of an XML data stream.

31. An apparatus for dynamically configuring client systems, comprising:

a host server;

a scripting language;

wherein said ,host server compiles scripts written in said scripting language into executable bytecodes;

wherein said host server, upon receipt of a request for specific up to date presentation components and/or executable bytecodes from a client system, checks if the client system's original presentation components and/or executable bytecodes have expired, wherein said host server separates response data into one or more raw data components, logic components, and presentation components and places said one or more raw data components into said universal data format;

wherein only required elements of said client system in terms of:
said one or more raw data components;
said one or more logic components; and
said one or more presentation components are sent independently by said server proxy client to said client system if the original presentation components and/or executable bytecodes on the client system have expired;

wherein logic component updates comprise updates to a common code base that is shared between different client device types and which enables said server proxy client to control a feature set of said client system independently of an implementation supplied by native client code and without modifying said native client code;

said apparatus further comprising a virtual machine on said client for interfacing at least said one or more logic components with said client system;

wherein a client system executes presentation components and/or executable bytecodes in response to a user's input;

wherein said client system maintains state information; and wherein said client system reuses at least a portion of said one or more raw data components for other display purposes.

32. The apparatus of claim 31, wherein said scripts define program logic.

33. The apparatus of claim 31, wherein said scripts create and control user interface displays.

34. The apparatus of claim 31, wherein said client system receives requested network information from said host server separated into raw data and presentation components.

35. A framework system for a handheld client device comprising:
a client-side framework;
a server/proxy client for controlling and modifying behavior of said client without having to update client code and for unifying communication with said client to a single protocol; and
a programming language for creating a device-specific application by adapting abstract representations of presentation and system objects within said framework to interface with a native operating system of said handheld client device;

wherein said server/proxy client, upon receipt of a request for specific up to date presentation components from a client system, checks if the client system's original presentation components and/or executable bytecodes have expired;

wherein said server proxy client updates said client system with raw data, presentation, and logic components, the raw data component comprising data retrieved from a server by said server proxy client in response to a client request, using a universal data format;

wherein said server proxy client separates raw data and presentation components of said response and places said raw data component into said universal data format, wherein said raw data and said presentation components are sent independently by said server proxy client to said client system;

wherein said server proxy client receives presentation and logic component updates for said client system; and wherein said presentation component updates are for a specific client device type;

wherein said logic component updates comprise updates to a common code base that is shared between different client device types and which enables said server proxy client to control a feature set of said client system independently of an implementation supplied by native client code and without modifying said native client code; and wherein said client system reuses at least a portion of said raw data for other display purposes.

36. The system of claim 35, wherein said server/proxy client comprises:
a proxy system module;
a protocol handler interpreting request messages from said client;
a content storage device; and
maintaining current state of a session between said client and a host system.

37. The system of claim 36, wherein said client session is persistent so that it can freely transition from one connectivity medium to another without losing state.

38. The system of claim 35, wherein said client-side framework comprises:
a presentation object layer;
an object layer;
an object runtime layer;
an abstraction layer; and
a bootstrap application layer.

39. The system of claim 38, wherein said bootstrap application layer comprises a native implementation of a kernel of said framework, said native implementation comprising a plurality of functions that bond said framework with a native operating system of said client device to handle device-specific issues and implement at least a portion of a user experience by deriving classes from said presentation layer.

40. The system of claim 38, where said abstraction layer comprises:
a transport abstraction for exchanging data with at least one host; and
a storage abstraction for managing caching and persistent storage.

41. The system of claim 38, wherein said object runtime layer comprises implementation of at least one abstract representation of a presentation object, wherein implementation of said at least one abstract representation of said presentation object comprises registering said at least one abstract representation with said object runtime layer.

42. The system of claim 38, wherein said object layer comprises:
Nachos objects comprising user interface objects; and
system objects comprising utility functions.

43. The system of claim 38, wherein said presentation object layer comprises a plurality of presentation objects, each presentation object in said presentation object layer comprising an abstract representation of said each presentation object.

44. The system of claim 35, further comprising a module for maintaining state information on said handheld client device.

45. The system of claim 35, wherein at least a portion of said framework is stored in re-writable storage.

* * * * *